United States Patent
Lee et al.

(10) Patent No.: US 10,499,419 B2
(45) Date of Patent: Dec. 3, 2019

(54) METHOD FOR TERMINAL FOR RECEIVING PHICH IN WIRELESS COMMUNICATION SYSTEM AND TERMINAL UTILIZING THE METHOD

(71) Applicant: LG ELECTRONICS INC., Seoul (KR)

(72) Inventors: Seungmin Lee, Seoul (KR); Suckchel Yang, Seoul (KR); Joonkui Ahn, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/573,713

(22) PCT Filed: May 16, 2016

(86) PCT No.: PCT/KR2016/005175
§ 371 (c)(1),
(2) Date: Nov. 13, 2017

(87) PCT Pub. No.: WO2016/182413
PCT Pub. Date: Nov. 17, 2016

(65) Prior Publication Data
US 2018/0152962 A1    May 31, 2018

Related U.S. Application Data

(60) Provisional application No. 62/161,875, filed on May 14, 2015.

(51) Int. Cl.
*H04W 72/12*    (2009.01)
*H04L 1/18*    (2006.01)
(Continued)

(52) U.S. Cl.
CPC ......... *H04W 72/1284* (2013.01); *H04L 5/001* (2013.01); *H04L 5/0048* (2013.01);
(Continued)

(58) Field of Classification Search
CPC ........ H04L 1/18; H04L 1/1864; H04L 1/1896
See application file for complete search history.

(56) References Cited

U.S. PATENT DOCUMENTS

2012/0275409 A1\* 11/2012 Han ...................... H04L 1/0007
370/329
2012/0307758 A1\* 12/2012 Moon ................... H04L 1/1854
370/329

(Continued)

FOREIGN PATENT DOCUMENTS

WO    2013006006    1/2013

OTHER PUBLICATIONS

Ericsson, "DL Control Signaling Enhancements for up to 32 CCs," R1-151798, 3GPP TSG RAN WG1 Meeting #80bis, Belgrade, Serbia, Apr. 10, 2015, see pp. 1, 4.

*Primary Examiner* — Scott M Sciacca
(74) *Attorney, Agent, or Firm* — Dentons US LLP

(57) ABSTRACT

Provided are a method for a terminal for receiving a PHICH in a wireless communication system and a terminal utilizing the method. The method is characterized in that a PUSCH is transmitted, whether or not a first PHICH resource corresponding to the PUSCH collides with a second PHICH resource corresponding to a different PUSCH is determined, and the PHICH for the PUSCH is received from the PHICH resource determined on the basis of the result of the determination, wherein if the first PHICH resource and second PHICH resource do collide, then the PHICH for the PUSCH is received from a new PHICH resource determined by utilizing an offset value.

13 Claims, 12 Drawing Sheets

(51) Int. Cl.
  *H04L 5/00* (2006.01)
  *H04W 72/04* (2009.01)
  *H04L 5/14* (2006.01)
  *H04W 74/08* (2009.01)
  *H04W 88/02* (2009.01)

(52) U.S. Cl.
  CPC .......... H04L 5/0051 (2013.01); H04L 5/0053 (2013.01); H04L 5/0055 (2013.01); H04L 5/0091 (2013.01); H04L 5/14 (2013.01); H04L 5/1469 (2013.01); H04W 72/042 (2013.01); *H04L 5/0044* (2013.01); *H04L 5/0098* (2013.01); *H04W 74/0858* (2013.01); *H04W 88/02* (2013.01)

(56) References Cited

U.S. PATENT DOCUMENTS

| | | | |
|---|---|---|---|
| 2013/0223297 A1 | 8/2013 | Zhang et al. | |
| 2013/0235812 A1* | 9/2013 | Heo | H04L 5/001 370/329 |
| 2013/0242882 A1* | 9/2013 | Blankenship | H04W 72/042 370/329 |
| 2014/0092785 A1* | 4/2014 | Song | H04L 1/00 370/280 |
| 2014/0126499 A1* | 5/2014 | Li | H04L 5/0094 370/329 |
| 2015/0036637 A1 | 2/2015 | Nayeb Nazar et al. | |
| 2015/0055597 A1 | 2/2015 | Han et al. | |
| 2015/0085713 A1* | 3/2015 | He | H04W 76/38 370/280 |
| 2016/0330697 A1* | 11/2016 | Chen | H04W 76/04 |

\* cited by examiner

METHOD FOR TERMINAL FOR RECEIVING PHICH IN WIRELESS COMMUNICATION SYSTEM AND TERMINAL UTILIZING THE METHOD

CROSS-REFERENCE TO RELATED APPLICATIONS

This application is the National Stage filing under 35 U.S.C. 371 of International Application No. PCT/KR2016/005175, filed on May 16, 2016, which claims the benefit of U.S. Provisional Application No. 62/161,875 filed on May 14, 2015, the contents of which are all hereby incorporated by reference herein in their entirety.

BACKGROUND OF THE INVENTION

Field of the Invention

The present invention relates to wireless communication, and more particularly, to a method in which a terminal receives a PHICH in a wireless communication system and a terminal using the method.

Related Art

International Telecommunication Union Radio (ITU-R) communication sector is proceeding with standardization of an International mobile telecommunication (IMT)-Advanced, a next-generation mobile communication system following the $3^{rd}$-generation. The IMT-Advanced aims at supporting Internet protocol (IP)-based multimedia services at a data rate of 1 Gbps in a stationary and low-speed movement state and at a data rate of 100 Mbps in a high speed movement state.

$3^{rd}$-generation partnership project (3GPP), a system standard that meets the requirements of the IMT-Advanced, provides long term evolution (LTE)-Advanced by improving the LTE which is based on an orthogonal frequency division multiple access (OFDMA)/single carrier-frequency division multiple access (SC-FDMA) transmission scheme. The LTE-advanced is one of potential candidates for the IMT-Advanced.

In the existing LTE-A, a maximum of five carriers (cells) are aggregated to provide carrier aggregation (CA), but, in a future wireless communication system, enhanced CA (eCA) of aggregating a maximum of 32 carriers (cells) is considered. eCA may be referred to as massive CA.

When the number of aggregated carriers (cells) increases, there are several problems. For example, in an existing physical hybrid-ARQ indicator channel (PHICH) transmitting method, a PHICH resource is determined in an assumption that maximum 5 cells may be set to the terminal, but as the number of cells increases, PHICH resources may collide.

For example, the terminal may receive scheduling of a plurality of uplink cells through one downlink cell. Acknowledgement/not-acknowledgement (ACK/NACK) of a transmission block transmitted from each of the plurality of uplink cells is transmitted through PHICHs of the one downlink cell. In this case, a resource in which each PHICH is transmitted, i.e., a PHICH resource is related and determined to a specific resource of an uplink data channel to which the transmission block is transmitted, for example, a resource having a lowest resource index. When uplink data channels in each of at least two uplink cells of a plurality of uplink cells use a resource having the same resource index, a PHICH resource may collide. Accordingly, it is difficult that the terminal appropriately receives ACK/NACK of a transmission block transmitted through an uplink data channel.

As the number of cells or carriers that may be aggregated increases, a probability increases in which a PHICH resource is to collide and a method and apparatus that can solve this are required.

SUMMARY OF THE INVENTION

The present invention provides a method in which a terminal receives a PHICH in a wireless communication system and a terminal device using the method.

In one aspect, provided is a method of receiving a physical hybrid-ARQ indicator channel (PHICH) of a User Equipment (UE) in a wireless communication system. The method includes transmitting a physical uplink shared channel (PUSCH), determining whether a first PHICH resource corresponding to the PUSCH collides with a second PHICH resource corresponding to another PUSCH; and receiving a PHICH of the PUSCH in a PHICH resource determined according to the determination result. A PHICH of the PUSCH is received in a new PHICH resource determined by applying an offset value, when the first PHICH resource collides with the second PHICH resource.

The first PHICH resource may be determined based on a lowest physical resource block (PRB) index transmitted by the PUSCH and a cyclic shift index of a reference signal transmitted by the PUSCH.

It may be determined that the first PHICH resource collides with the second PHICH resource, when a lowest PRB index that determines the first PHICH resource and a cyclic shift index of a reference signal are the same as a lowest PRB index that determines the second PHICH resource and a cyclic shift index of a reference signal.

The offset value may be a lowest CCE index value among control channel element (CCE) index values of resources that receive downlink control information (DCI) that schedules the PUSCH.

The offset value may be a lowest ECCE index value among enhanced control channel element (ECCE) index values of resources that receive downlink control information (DCI) that schedules the PUSCH.

The offset value may be a carrier indicator field (CIF) value included in downlink control information (DCI) that schedules the PUSCH.

The offset value may be preset to the UE.

The offset value may be a value added to a cyclic shift index of a reference signal transmitted by the PUSCH.

The PUSCH and the another PUSCH may be simultaneously transmitted by the UE, but the PUSCH may be transmitted by the UE through a first cell and the another PUSCH may be transmitted by the UE through a second cell.

The first cell and the second cell may have different frequencies.

The PUSCH and the another PUSCH may be scheduled by DCI received in one downlink cell.

The new PHICH resource may be determined not to collide with the second PHICH resource by the offset value.

A PHICH of the PUSCH may be received through the first PHICH resource, when the first PHICH resource does not collide with the second PHICH resource.

A User Equipment (UE) includes a radio frequency (RF) unit configured to transmit and receive a wireless signal and a processor connected the RF unit. The processor transmits a physical uplink shared channel (PUSCH), determines whether a first PHICH resource corresponding to the PUSCH collides with a second PHICH resource corresponding to another PUSCH, receives a PHICH of the PUSCH in a PHICH resource determined according to the determination result. A PHICH of the PUSCH is received in a new PHICH resource determined by applying an offset value, when the first PHICH resource collides with the second PHICH resource.

In a wireless communication system that supports aggregation of carriers (cell) more than 5, collision of PHICH resources can be prevented. Therefore, an ACK/NACK receiving performance of a transmission block transmitted to uplink by a terminal is enhanced and unnecessary retransmission can be prevented.

DESCRIPTION OF EXEMPLARY EMBODIMENTS

The following technology can be used in a variety of multiple access schemes, such as Code Division Multiple Access (CDMA), Frequency Division Multiple Access (FDMA), Time Division Multiple Access (TDMA), Orthogonal Frequency Division Multiple Access (OFDMA), and Single Carrier-Frequency Division Multiple Access (SC-FDMA). CDMA can be implemented using radio technology, such as Universal Terrestrial Radio Access (UTRA) or CDMA2000. TDMA can be implemented by radio technology, such as Global System for Mobile communications (GSM)/General Packet Radio Service (GPRS)/Enhanced Data Rates for GSM Evolution (EDGE). OFDMA can be implemented by radio technology, such as IEEE 802.11 (Wi-Fi), IEEE 802.16 (WiMAX), IEEE 802.20, or Evolved UTRA (E-UTRA). IEEE 802.16m is the evolution of IEEE 802.16e, and it provides backward compatibility with a system based on IEEE 802.16e. UTRA is part of a Universal Mobile Telecommunications System (UMTS). 3$^{rd}$ Generation Partnership Project (3GPP) Long Term Evolution (LTE) is part of an Evolved UMTS (E-UMTS) using Evolved-UMTS Terrestrial Radio Access (E-UTRA). 3GPP LTE adopts OFDMA in downlink and adopts SC-FDMA in uplink. LTE-Advanced (A) is the evolution of 3GPP LTE. In order to clarify a description, a situation in which the present invention is applied to an LTE-A system is assumed, but the technical spirit of the present invention is not limited thereto.

Figure 1:
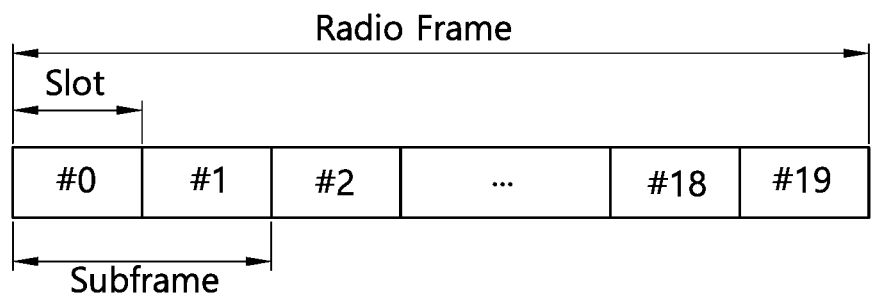
FIG. 1 shows the structure of a radio frame in 3GPP LTE/LTE-A.

FIG. 1 shows the structure of a radio frame in 3GPP LTE/LTE-A.

Referring to FIG. 1, the radio frame includes 10 subframes, and each of the subframes includes 2 slots. The slots within the radio frame are given slot numbers from #0 to #19. The time that is taken for one subframe to be transmitted is called a Transmission Time Interval (TTI). The TTI can be called a scheduling unit for data transmission. For example, the length of one radio frame can be 10 ms, the length of one subframe can be 1 ms, and the length of one slot can be 0.5 ms. The structure of the radio frame is only an example. Accordingly, the number of subframes included in the radio frame or the number of slots included in the subframe can be changed in various ways.

Figure 2:
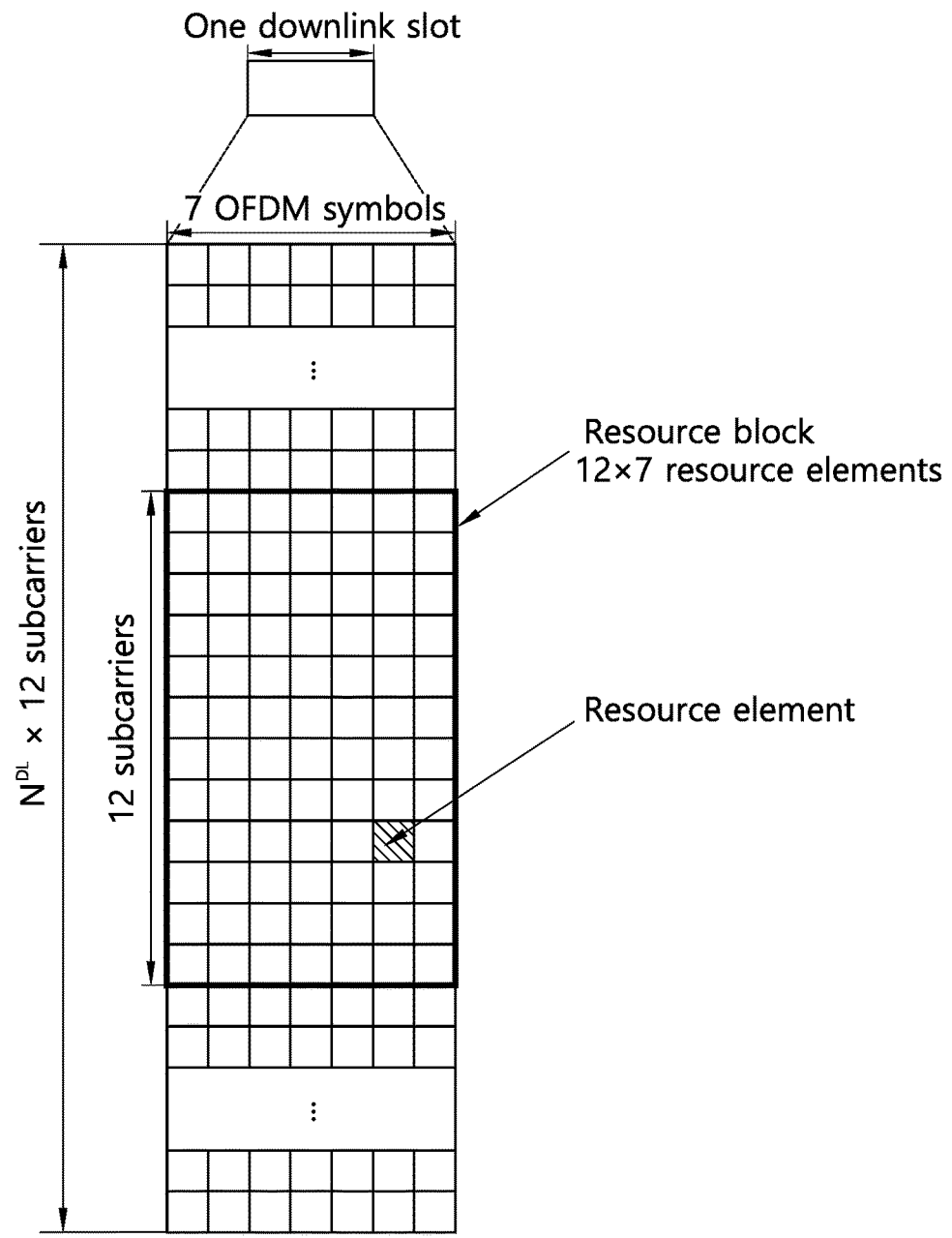
FIG. 2 shows an example of a resource grid for one slot.

FIG. 2 shows an example of a resource grid for one slot.

The slot includes a downlink slot and an uplink slot. The downlink slot includes a plurality of Orthogonal Frequency Division Multiplexing (OFDM) symbols in a time domain. The OFDM symbol indicates a specific time interval, and the OFDM symbol may also be called an SC-FDMA symbol depending on a transmission method. The downlink slot includes an $N_{RB}$ number of Resource Blocks (RBs) in a frequency domain. The RB is a resource allocation unit, and the RB includes one slot in the time domain and a plurality of contiguous subcarriers in the frequency domain.

The number of RBs $N_{RB}$ included in the downlink slot depends on a downlink transmission bandwidth configured in a cell. For example, in an LTE system, the number $N_{RB}$ can be any one of 6 to 110. An uplink slot can have the same structure as the downlink slot.

Each element on the resource grid is called a Resource Element (RE). An RE on the resource grid can be identified by an index pair (k,l) within a slot. Here, k (k=0, . . . , $N_{RB} \times 12-1$) is a subcarrier index within the frequency domain, and l(l=0, . . . , 6) is an OFDM symbol index within the time domain.

One RB is illustrated as including 7×12 REs, including 7 OFDM symbols in the time domain and 12 subcarriers in the frequency domain, but the number of OFDM symbols and the number of subcarriers within one RB are not limited thereto. The number of OFDM symbols and the number of subcarriers can be changed in various ways depending on the length of a CP, frequency spacing, etc. For example, in the case of a normal Cyclic Prefix (CP), the number of OFDM symbols is 7 and in the case of an extended CP, the number of OFDM symbols is 6. In one OFDM symbol, one of 128, 256, 512, 1024, 1536, and 2048 can be selected and used as the number of subcarriers.

Figure 3:
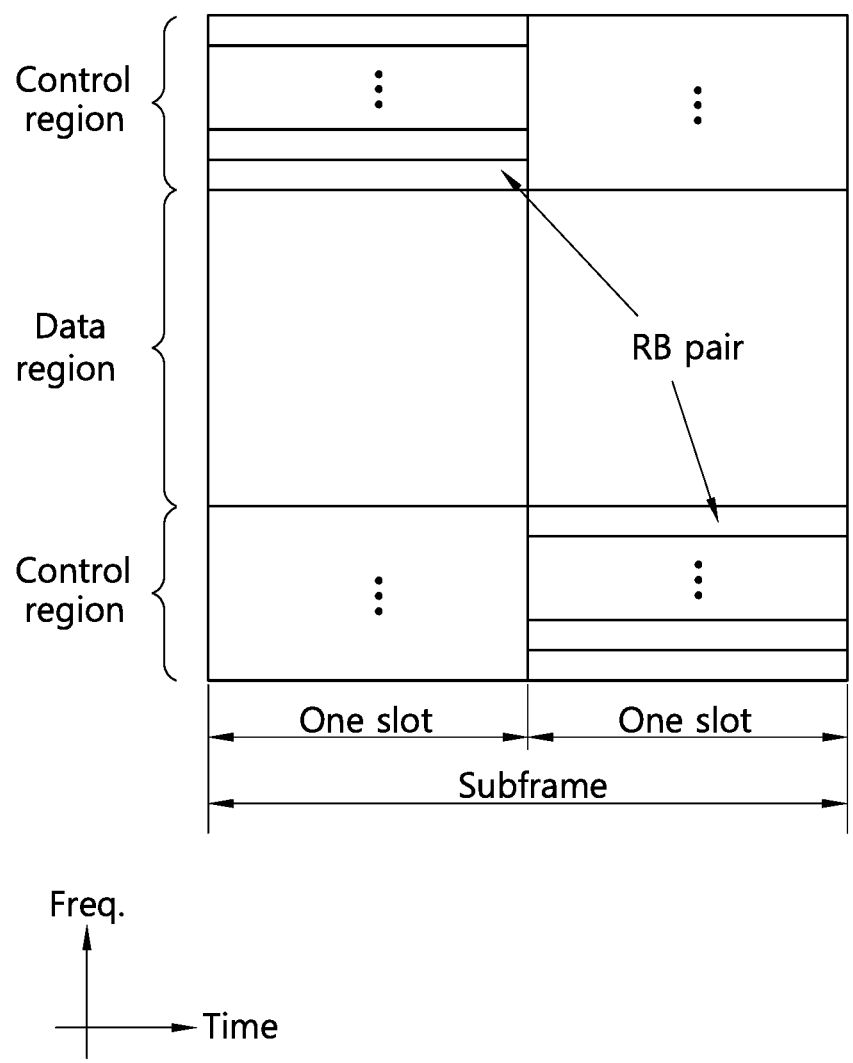
FIG. 3 shows the structure of an uplink subframe.

FIG. 3 shows the structure of an uplink subframe.

The uplink subframe can be divided into a control region and a data region in a frequency domain. Physical uplink control channels (PUCCHs) on which uplink control information is transmitted are allocated to the control region. Physical uplink shared channels (PUSCHs) through which data is transmitted are allocated to the data region. A terminal (user equipment: UE) may send or may not send a PUCCH and a PUSCH at the same time depending on a configuration.

A PUCCH for one terminal is allocated as an RB pair in a subframe. RBs belonging to the RB pair occupy different subcarriers in a first slot and a second slot. A frequency occupied by RBs that belong to an RB pair allocated to a PUCCH is changed on the basis of a slot boundary. This is called that the RB pair allocated to the PUCCH has been frequency-hopped in the slot boundary. A terminal can obtain a frequency diversity gain by sending uplink control information through different subcarriers over time.

Uplink control information transmitted on a PUCCH includes ACK/NACK, Channel State Information (CSI) indicative of a downlink channel state, a Scheduling Request (SR), that is, an uplink radio resource allocation request, etc.

The CSI includes a Precoding Matrix Index (PMI) indicative of a precoding matrix, a Rank Indicator (RI) indicative of a rank value that is preferred by UE, a Channel Quality Indicator (CQI) indicative of a channel state, etc.

A PUSCH is mapped to an uplink shared channel (UL-SCH), that is, a transport channel. Uplink data transmitted on the PUSCH can be a transmission block, that is, a data block for an UL-SCH that is transmitted during a TTI. The transmission block can be user information. Alternatively, the uplink data can be multiplexed data. The multiplexed data can be obtained by multiplexing the transmission block for the UL-SCH and control information. For example, control information multiplexed with data can include a CQI, a PMI, ACK/NACK, an RI, etc. Alternatively, the uplink data may include only control information.

Figure 4:
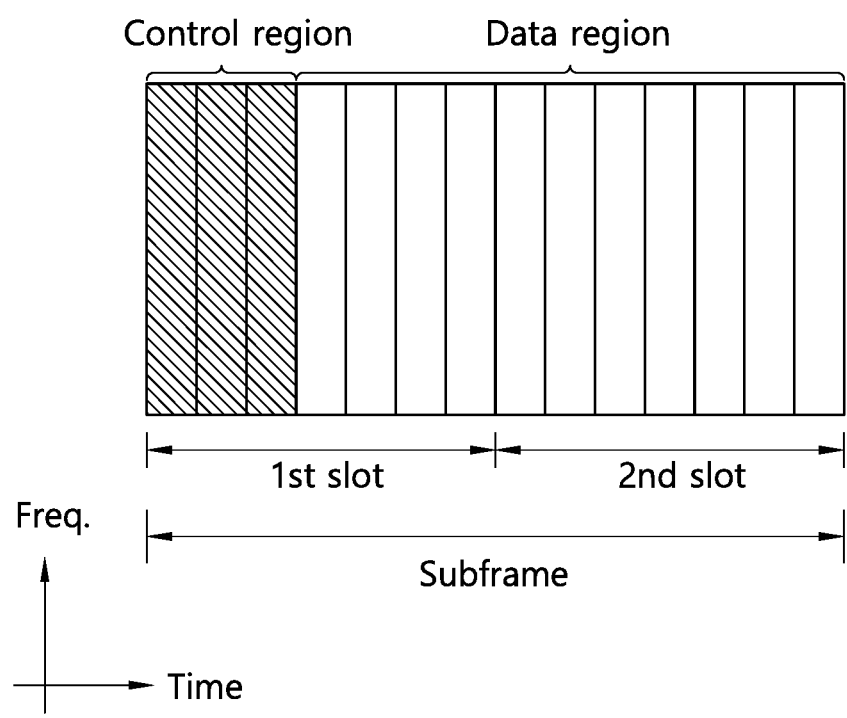
FIG. 4 shows the structure of a downlink subframe.

FIG. 4 illustrates a structure of a downlink (DL) subframe.

A DL subframe includes two slots in a time domain and each slot includes seven 01-DM symbols in a normal CP (or six OFDM symbols in an extended CP). A maximum of first three OFDM symbols of a first slot of the subframe (a maximum of 4 OFDM symbols regarding a 1.4 MHz bandwidth) are a control region to which control channels are allocated, and the other OFDM symbols are a data region to which a physical downlink shared channel (PDSCH) is allocated. The PDSCH refers to a change in which a base station (BS) or a node transmits data to a user equipment (UE).

The control channel transmitted in the control region includes a physical control format indicator channel (PCFICH), a physical hybrid-ARQ indicator channel (PHICH), and a physical downlink control channel (PDCCH).

The PCFICH transmitted in the first OFDM symbol of the subframe carries a control format indicator (CFI), information regarding the number of OFDM symbols (i.e., a size of the control region) used for transmission of control channels within the subframe. After the UE first receives a CFI on the PCFICH, the UE monitors a PDCCH. The PCFICH is transmitted through a fixed PCFICH resource of the subframe.

The PHICH carries a ACK(acknowledgement)/NACK (not-acknowledgement) signal for an uplink hybrid automatic repeat request (HARQ). The ACK/NACK signal regarding uplink data transmitted from the UE is transmitted on the PHICH.

The PDCCH is a control channel transmitting downlink control information (DCI). The DCI may include resource allocation of a PDSCH (which may also be referred to as "downlink (DL) grant", resource allocation of a physical uplink shared channel (PUSCH) (which may also be referred to as "uplink (UL) grant"), an aggregation of a transmission power control command regarding individual UEs of a certain UE group and/or activation of a VoIP (Voice over Internet Protocol).

Figure 5:
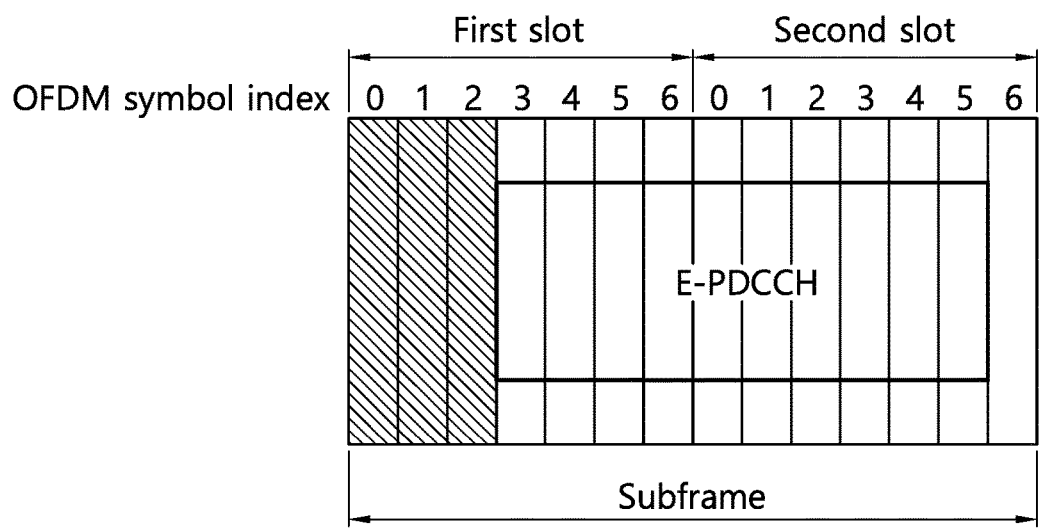
FIG. 5 illustrates an EPDCCH.

FIG. 5 illustrates an EPDCCH.

Referring to FIG. 5, an EPDCCH may be positioned to follow an existing control region in a time domain. For example, when the existing control region is transmitted in first three OFDM symbols of a subframe, the EPDCCH may be positioned in OFDM symbols positioned to follow the three OFDM symbols. In a frequency domain, the existing control region and the PEDCCH may be configured to correspond to each other or to be different. For example, the PDCCH is transmitted in the entire system band, whereas the PEDCCH may be transmitted only in the same frequency band as that of the PDSCH transmitted for a specific UE. In FIG. 5, an example in which the PEDCCH is transmitted only in some frequency band of the existing control region is illustrated. In the EPDCCH, control information for an advanced UE may be transmitted. In the EPDCCH, a reference signal for demodulation of the PDSCH may be transmitted.

Figure 6:
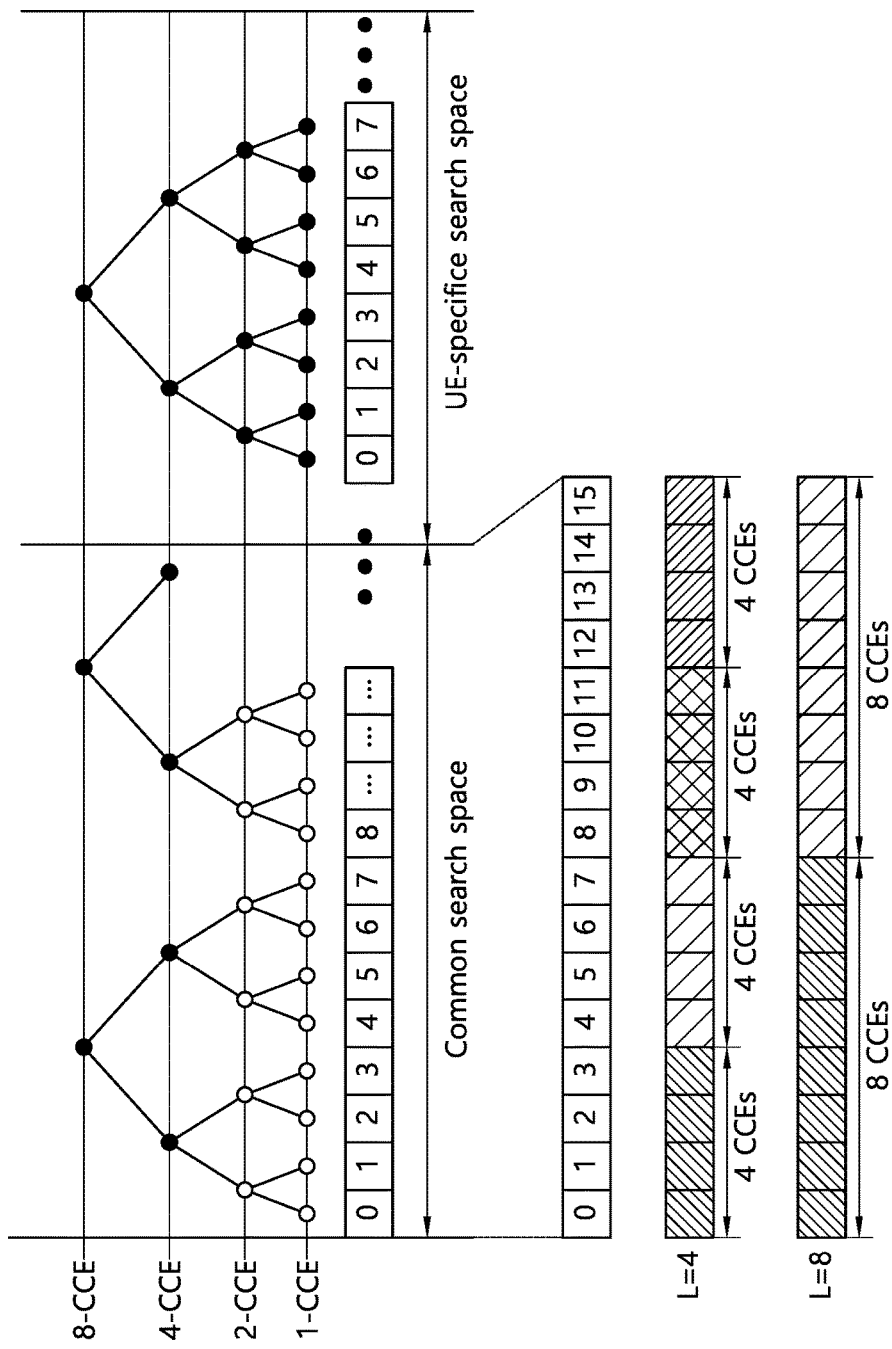
FIG. 6 is a view illustrating monitoring of a control channel and a search space (SS).

FIG. 6 is a view illustrating monitoring of a control channel and a search space (SS).

A control region of a subframe includes a plurality of control channel elements (CCEs). A CCE is a logical allocation unit used for providing a coding rate based on a state of a wireless channel to a PDCCH and corresponds to a plurality of resource element groups (REGs). An REG includes a plurality of resource elements. A format of a PDCCH and the number of available bits of the PDCCH are determined according to a correlation between the number of CCEs and a coding rate provided by the CCEEs. One REG includes four Res, and one CCE includes nine REGs. In order to configure one PDCCH, $\{1, 2, 4, 8\}$ number of CCEs may be used, and each element of $\{1, 2, 4, 8\}$ is called a CCE aggregation level (AL).

In 3GG LTE/LTE-A, blind decoding (BD) is used to detect a PDCCH. A UE does not know, in advance, in which position of a control region a PDCCH of the UE is transmitted. Thus, the UE checks a cyclic redundancy check (CRC) error in a PDCCH received in each of resources in which the PDCCH may be present (which is called a PDCCH candidate) to determine whether a corresponding PDCCH is a control channel of the UE. This is called blind decoding.

That is, a plurality of PDCCHs may be transmitted in a control region of each subframe. The UE monitors the plurality of PDCCHs in each subframe. Here, monitoring refers to UE attempting blind decoding of a PDCCH.

In the 3GPP LTE, in order to reduce a burden of blind decoding, a search space (SS) is used. The SS may be a monitoring set of a CCE for a PDCCH or may be a set of PDCCH candidates. The UE monitors a PDCCH in a corresponding SS.

The SS is divided into a common SS (CSS) and a UE-specific search space (USS). The CSS, a space for searching for a PDCCH having common control information, includes 16 control channel elements (CCEs) from CCE indices 0 to 15 and supports a PDCCH having a CCE aggregation level (AL) of $\{4, 8\}$. However, even in the CSS, a PDCCH (DCI formats 0, 1A) carrying UE-specific information may be transmitted. The UE-specific SS supports a PDCCH having a CCE AL of $\{1, 2, 4, 8\}$.

A starting point of a SS is defined to be different in the CSS and in the UE-specific SS. A starting point of the CSS is fixated, regardless of subframe, while a starting point of the UE-specific SS may differ in each subframe according to a UE identifier (e.g., C-RNTI), a CCE AL and/or a slot number of a radio frame. When a starting point of the UE-specific SS is within the CSS, the UE-specific SS and the CSS may overlap. In FIG. 6, a PDCCH is illustrated and described, but an SS may also be configured for an EPDCCH, like the PDCCH. An SS of the EPDCCH includes an ECCE.

<Carrier Aggregation (CA)>

Hereinafter, CA will be described.

Figure 7:
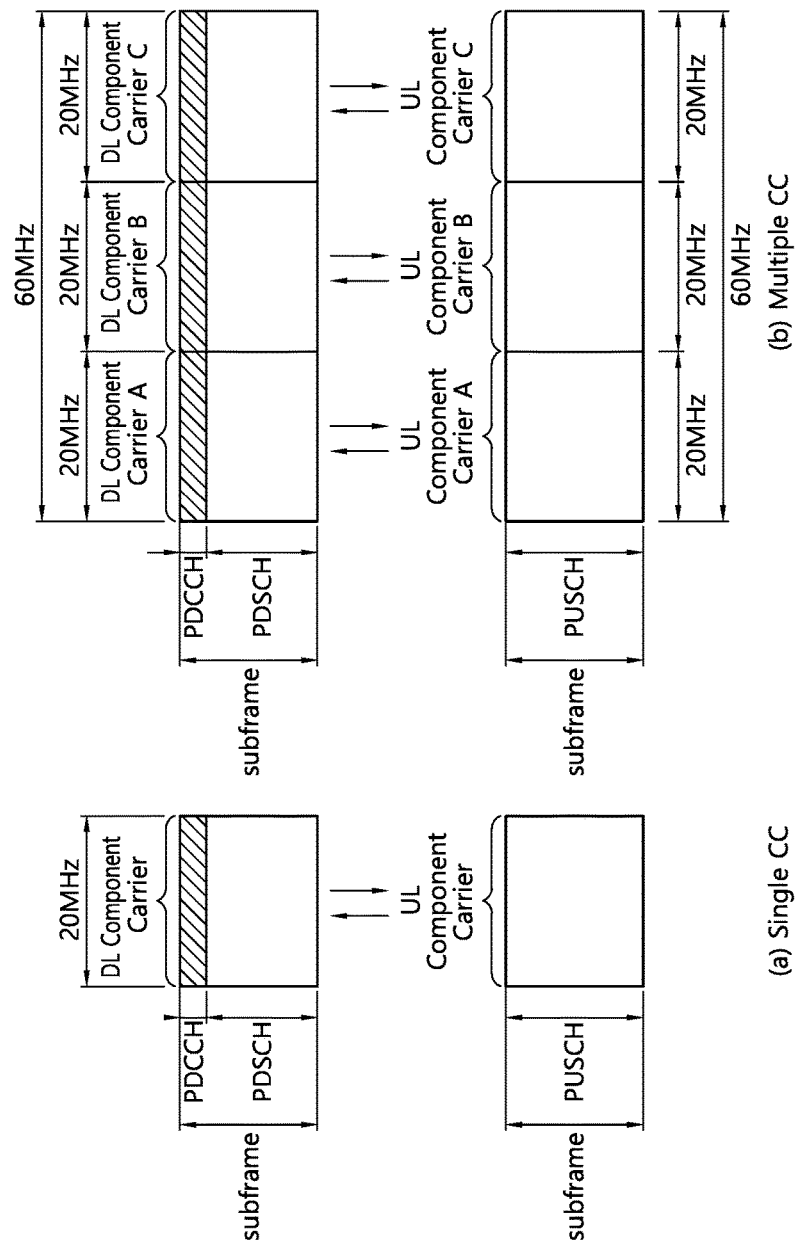
FIG. 7 is a comparison example of an existing single carrier system and a CA system.

FIG. 7 is a comparison example of an existing single carrier system and a CA system.

Referring to FIG. 7, in a single carrier system, only a single carrier is supported for UE in uplink and downlink. The bandwidth of a carrier may be various, but the number of carriers assigned to UE is one. In contrast, in a Carrier Aggregation (CA) system, a plurality of CCs DL CCs A to C and UL CCs A to C may be assigned to UE. A Component Carrier (CC) means a carrier used in a CA system, and it may be abbreviated as a carrier. For example, in order to allocate a bandwidth of 60 MHz to UE, 3 CCs each having 20 MHz may be assigned to the UE.

A CA system may be divided into a contiguous CA system in which aggregated carriers are contiguous to each other and a non-contiguous CA system in which aggregated carriers are separated from each other. When it is simply called a CA system hereinafter, it should be understood that the CA system includes a case where CCs are contiguous and a case where CCS are not contiguous.

A CC, that is, a target when one or more CCs are aggregated, may use bandwidths used in an existing system for backward compatibility with the existing system. For example, a 3GPP LTE system supports bandwidths of 1.4 MHz, 3 MHz, 5 MHz, 10 MHz, 15 MHz, and 20 MHz. A 3GPP LTE-A system may configure a broadband of 20 MHz or higher using only the bandwidths of the 3GPP LTE system. Alternatively, a 3GPP LTE-A system may configure a broadband by defining new bandwidths without using the bandwidths of an existing system.

The system frequency band of a wireless communication system is divided into a plurality of carrier frequencies. In this case, the carrier frequency means the center frequency of a cell. Hereinafter, a cell may mean downlink frequency resources and uplink frequency resources. Alternatively, a cell may mean a combination of downlink frequency resources and optional uplink frequency resources. Furthermore, in general, if a CA is not taken into consideration, a single cell may always include uplink and downlink frequency resources that form a pair.

In order for packet data to be transmitted and received through a specific cell, UE first has to complete a configuration for the specific cell. In this case, the configuration means a state in which the reception of system information necessary to transmit and receive data to and from the specific cell has been completed. For example, the configuration may include an overall process of receiving common physical layer parameters necessary for the transmission/reception of data, Medium Access Control (MAC) layer parameters, or parameters necessary for a specific operation in the RRC layer. A configuration-completed cell is in a state in which the cell may immediately transmit and receive packet data only it has only to receive information about which the packet data may be transmitted.

A cell in the configuration-completed state may be in the activation or deactivation state. In this case, the activation refers to a state in which data is being transmitted or received or a state in which data is ready to be transmitted or received. UE may monitor and receive the control channel (PDCCH) and data channel (PDSCH) of an activated cell in order to check resources (they may be the frequency, the time, etc.) assigned thereto.

Deactivation refers to a state in which traffic data cannot be transmitted or received, but measurement or the transmission/reception of minimum information are possible. UE may receive necessary System Information (SI) in order to receive packets from a deactivated cell. In contrast, the UE does not monitor or receive the control channel (PDCCH) and data channel (PDSCH) of a deactivated cell in order to check resources (they may be a frequency, time, etc.) assigned thereto.

Cells may be classified into a primary cell, a secondary cell, and a serving cell.

The primary cell means a cell that operates in a primary frequency, a cell in which UE performs an initial connection establishment procedure or a connection re-establishment procedure with a BS, or a cell that is indicated as a primary cell in a handover process.

The secondary cell means a cell that operates in a secondary frequency. The secondary cell is configured once RRC establishment is set up and used to provide additional radio resources.

The serving cell is formed of a primary cell in the case of UE in which a Carrier Aggregation (CA) has not been configured or to which a CA cannot be provided. If a CA has been configured for UE, the term 'serving cell' indicates a cell configured for UE and may be plural in this case. One serving cell may include a single DL CC or a pair of {DL CC, UL CC}. A plurality of serving cells may include a primary cell and one of all secondary cells or a set of a plurality of secondary cells.

A Primary Component Carrier (PCC) means a Component Carrier (CC) corresponding to a primary cell. A PCC is a CC through which UE forms connection or RRC connection with a BS at the early stage from among some CCs. A PCC is a special CC that is responsible for connection or RRC connection for signaling regarding a plurality of CCs and that manages UE context, that is, connection information related to UE. Furthermore, a PCC is always in the activation state when it is in RRC connected mode after forming connection or RRC connection with UE. A DL CC corresponding to a primary cell is called a DL Primary Component Carrier (DL PCC), and an UL CC corresponding to a primary cell is called an UL Primary Component Carrier (UL PCC).

A Secondary Component Carrier (SCC) means a CC corresponding to a secondary cell. That is, an SCC is a CC assigned to UE in addition to a PCC and is a carrier extended for additional resource assignment, etc. by UE in addition to a PCC. An SCC may be divided into the activation or deactivation state. A DL CC corresponding to a secondary cell is called a DL Secondary Component Carrier (DL SCC). An UL CC corresponding to a secondary cell is called an UL Secondary Component Carrier (UL SCC).

A primary cell and a secondary cell have the following characteristics.

First, a primary cell is used to transmit a PUCCH. Second, a primary cell is always activated, whereas a secondary cell is a carrier that is activated or deactivated according to specific conditions. Third, when a primary cell experiences a Radio Link Failure (hereinafter referred to as an RLF), RRC re-establishment is triggered. Fourth, a primary cell may be changed by a change of a security key or by a handover procedure that is accompanied by a random access channel (RACH) procedure. Fifth, Non-Access Stratum (NAS) information is received through a primary cell. Sixth, in the case of an FDD system, a primary cell is always formed of a pair of a DL PCC and an UL PCC. Seventh, a different CC may be configured as a primary cell in each UE. Eighth, a primary cell may be replaced through only a handover process or a cell selection/cell reselection process. In adding a new secondary cell, RRC signaling may be used to transmit system information about a dedicated secondary cell.

In relation to a CC that forms a serving cell, a DL CC may form a single serving cell, or a DL CC and an UL CC may form a single serving cell through connection establishment. However, a serving cell is not formed of only a single UL CC.

The activation/deactivation of a CC has the same concept as the activation/deactivation of a serving cell. For example, assuming that a serving cell1 is formed of a DL CC1, the activation of the serving cell1 means the activation of the DL CC1. Assuming that a serving cell2 is configured through connection establishment of a DL CC2 and an UL CC2, the activation of the serving cell2 means the activation of the DL CC2 and the UL CC2. In this sense, each CC may correspond to a cell.

The number of CCs that are aggregated between downlink and uplink may be differently set. A case where the number of aggregated DL CCs is the same as the number of aggregated UL CCs is called a symmetric aggregation, and a case where the number of aggregated DL CCs is different from the number of aggregated UL CCs is called an asymmetric aggregation. Furthermore, the CCs may have different sizes (i.e., bandwidths). For example, assuming that 5 CCs are used to form a 70 MHz band, the 70 MHz band may be configured like 5 MHz CC (carrier #0)+20 MHz CC (carrier #1)+20 MHz CC (carrier #2)+20 MHz CC (carrier #3)+5 MHz CC (carrier #4).

As described above, unlike a single carrier system, a CA system can support a plurality of CCs, that is, a plurality of serving cells.

Such a CA system can support non-cross-carrier scheduling and cross-carrier scheduling.

Figure 8:
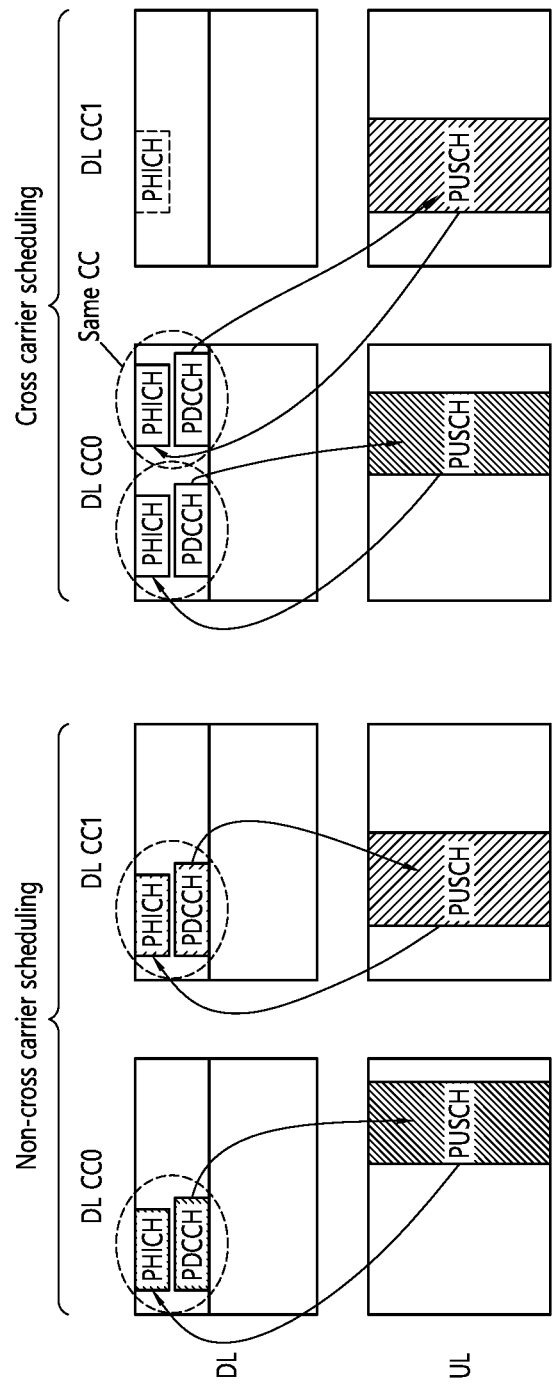
FIG. 8 illustrates non-cross-carrier scheduling and cross-carrier scheduling.

FIG. 8 illustrates non-cross-carrier scheduling and cross-carrier scheduling.

Non-cross-carrier scheduling may be said to be a method of simply extending and applying a conventional scheduling method in a single cell to a plurality of cells. If there is a PDSCH scheduled by a PDCCH, the PDCCH/PDSCH is transmitted through the same CC, and the PDCCH may schedule a PUSCH transmitted through a CC basically linked to a specific CC.

Cross-carrier scheduling is a scheduling method capable of performing the resource assignment of PDSCHs transmitted through different CCs and/or the resource assignment of PUSCHs transmitted through CCs other than CCs basically linked to a specific CC, through a PDCCH transmitted through the specific CC. That is, a PDCCH and a PDSCH may be transmitted through different DL CCs, and a PUSCH may be transmitted through another UL CC other than an UL CC that is linked to a DL CC on which a PDCCH including an UL grant has been transmitted. As described above, in a system supporting cross-carrier scheduling, a carrier indicator informing that a PDSCH/PUSCH providing control information are transmitted through what DL CC/UL CC is necessary for a PDCCH. A field including such a carrier indicator is hereinafter called a Carrier Indication Field (CIF).

A CA system supporting cross-carrier scheduling may include a CIF in a conventional Downlink Control Information (DCI) format. In a system supporting cross-carrier scheduling, for example, in an LTE-A system, 3 bits may be extended because a CIF is added to an existing DCI format (i.e., a DCI format used in LTE). In the structure of a PDCCH, an existing coding method and resource assignment method (i.e., resource mapping based on a CCE) may be reused.

Hereinafter, the present disclosure will be described.

The present invention provides a method of efficiently solving a collision problem of a physical hybrid ARQ indicator channel (PHICH) resource. Particularly, the present invention provides a method of efficiently solving a collision problem of a PHICH resource in an UE in which cells more than existing five cells may be aggregated. Hereinafter, the UE may be an UE that can support aggregation of more than 5 cells. The reason of a collision problem of the PHICH resource may be at least one of a limitation of the number of orthogonal sequences multiplexed on the same resource block, limitation of the number of PHICH groups, and limitation of a field value of parameters (e.g., DM-RS CS (cyclic shift) on a UL DCI format) that can designate or allocate different PHICH resources and the number of a lowest PRB index (on a first slot) related to transmission of a PUSCH.

For example, a PHICH resource collision problem may occur at the following two cases. In a first case (CASE#A), from a specific UE viewpoint, a plurality of uplink cells are cross carrier scheduled (CCS) from one downlink cell, and PUSCH transmissions in some or entire uplink cell may be performed or scheduled based on the same 'lowest PRB index' and/or the same 'DM-RS CS index for a PUSCH (at a first slot)', and in a second case (CASE#B), PUSCH transmissions of different UEs (on the same or different uplink cells) may be performed or scheduled based on the same 'lowest PRB index' and/or the same 'DM-RS CS index for a PUSCH (at a first slot)'. In a second case, for example, PHICH timing and a receiving downlink cell may be in the same situation.

Hereinafter, for convenience of description, a license band-based cell and a non-license band (LTE-U)-based cell are referred to as "LCELL" and "UCELL", respectively. Further, an aperiodically secured/configured resource period in a corresponding UCELL is referred to as a "reserved resource period (RRP)". A rule may be defined such that a PDSCH related control information channel transmitted on a downlink subframe (DL SF) of an RRP segment, i.e., a subframe designated to downlink use or an uplink subframe (UL SF) of a RRP segment, i.e., a PUSCH related control information channel transmitted on a subframe designated to uplink use is set (i.e., CCS) to be transmitted from a previously defined LCELL or is transmitted (i.e., self-scheduling (SFS)) from the same UCELL.

In another example, a PDSCH reception related downlink control information channel on an RRP segment may be implemented into a form in which one downlink control information channel schedules one PDSCH received at the same (or specific) time point (i.e., a downlink control information channel and a PDSCH scheduled by the channel are received within the same subframe. This may be referred to as a single subframe scheduling (SSFS)). Alternatively, a PDSCH reception related downlink control information channel on an RRP segment may be implemented into a form in which one downlink control information channel schedules one PDSCH received at the same (or specific) time point as well as PDSCHs of the previously defined (or signaled) number received at other time points. This is referred to as multi-subframe scheduling (MSFS).

In consideration that an RRP segment on an UCELL is an aperiodically or discontinuously configured resource according to a cyclic shift (CS) result, a corresponding RRP segment may be redefined or reinterpreted in view of the UE operation and assumption. For example, an RRP segment in an UCELL may be redefined to a segment assumed that the UE performs a time/frequency synchronization operation of the UCELL or a synchronization signal (e.g., PSS, SSS) for this is transmitted from the base station and/or a segment assumed that the UE performs a CSI measurement operation of the UCELL or that a reference signal (e.g., CRS, CSI-RS) for this from the base station is transmitted and/or a segment in which the UE performs a data transmission (/reception) related DCI detection operation in an UCELL and/or a segment in which the UE performs a (temporary) buffering operation of a signal received in the UCELL.

Hereinafter, for convenience of description, a suggested method will be described based on a 3GPP LTE/LTE-A system. However, a range of a system to which a suggested method is applied may be enlarged to other systems in addition to the 3GPP LTE/LTE-A system.

First, a method of setting a PHICH resource in an LTE/LTE-A system will be described.

When a plurality of timing advance groups (TAG) are not set to an UE or when a plurality of TAGs are set to the UE and when PUSCH transmission scheduled from a serving cell c in a subframe n is not scheduled by random access response grant corresponding to random access preamble transmission for a secondary cell, for PUSCH transmission scheduled from a serving cell c in the subframe n, a corresponding PHICH resource in a subframe $n+k_{PHICH}$ of the serving cell c may be determined as follows. First, a method of determining $k_{PHICH}$ in various situations will be described, and a method of determining a detailed resource within a corresponding subframe will be described.

First, for a FDD, $k_{PHICH}$ is always 4. In carrier aggregation of FDD-TDD, in a case of another serving cell in which a serving cell c is TDD (i.e., frame structure type 2) and in which PUSCH transmission is FDD (i.e., frame structure type 1), $k_{PHICH}$ is 6. In carrier aggregation of FDD-TDD, in a case of a serving cell in which the serving cell c is FDD (i.e., frame structure type 1) and in which PUSCH transmission is FDD (i.e., frame structure type 1), $k_{PHICH}$ is 4. In carrier aggregation of FDD-TDD, in a case of another serving cell in which the serving cell c is FDD (i.e., frame structure type 1) and in which PUSCH transmission is TDD (i.e., frame structure type 2), $k_{PHICH}$ may be given as in Table 1.

TABLE 1

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | | 4 | 7 |

In TDD, when 'EIMTA-MainConfigServCell-r12' of a random serving cell is not set to the UE and when one serving cell is set to the UE, or when two or more serving cells are set to the UE and when a TDD UL-DL configuration of entire preset serving cells is the same, for PUSCH transmission scheduled from a serving cell c in a subframe n, the UE determines a corresponding PHICH resource in a subframe $n+k_{PHICH}$ of the serving cell c, and in this case, the $k_{PHICH}$ is given in Table 1.

In TDD, when two or more serving cells are set to the UE and when a TDD UL-DL configuration of at least two preset serving cells are not the same, or when 'EIMTA-MainConfigServCell-r12' of at least one serving cell is set, or in carrier aggregation of FDD-TDD, in a serving cell c, which is TDD, for PUSCH transmission scheduled from the serving cell c in a subframe n, the UE determines a corresponding PHICH resource in a subframe $n+k_{PHICH}$ of the serving cell c, and in this case, the $k_{PHICH}$ is given in Table 1. However, here, a TDD UL-DL configuration means a UL-reference UL-DL configuration of a serving cell corresponding to PUSCH transmission. The UL-reference UL-DL configuration may be referred to as UL-DL configuration used for determining HARQ timing, and may be the same as or may be different from a UL-DL configuration specifically given to the cell.

A plurality of timing advance groups (TAG) are set to the UE, and when PUSCH transmission in a subframe n for a secondary cell c is scheduled by random access response grant corresponding to random access preamble transmission for the secondary cell c, $k_{PHICH}$ may be determined as follows.

In TDD, when two or more serving cells are set to the UE and when TDD UL-DL configuration of at least two preset serving cells is not the same, or when 'EIMTA-MainConfigServCell-r12' of at least one serving cell is set, or in carrier aggregation of FDD-TDD, in a serving cell c, which is TDD, a TDD UL-DL configuration means a UL-reference UL-DL configuration of a secondary cell c corresponding to PUSCH transmission.

When the UE is not set such that another serving cell monitors a PDCCH/EPDCCH having a carrier indicator field (CIF) corresponding to the secondary cell c (i.e., when cross-carrier scheduling is not set), the UE determines a corresponding PHICH resource in a subframe $n+k_{PHICH}$ of the secondary cell c, and in this case, $k_{PHICH}$ may be determined as follows.

First, for FDD, $k_{PHICH}$ is always 4, and for TDD, $k_{PHICH}$ is given in Table 1. In FDD-TDD carrier aggregation, for the secondary cell c, which is the FDD, $k_{PHICH}$ is 4. In FDD-TDD carrier aggregation, for the secondary cell c, which is the TDD, $k_{PHICH}$ is given in Table 1.

When the UE is set such that another serving cell c1 monitors a PDCCH/EPDCCH having a carrier indicator field (CIF) corresponding to the secondary cell c (i.e., when cross-carrier scheduling is set), the UE to which a plurality of TAGs are set determines a PHICH resource corresponding to a subframe $n+k_{PHICH}$ of the secondary cell c1, and in this case, $k_{PHICH}$ may be determined as follows.

First, for the FDD, $k_{PHICH}$ is always 4, and for the TDD, $k_{PHICH}$ is given in Table 1. In FDD-TDD carrier aggregation, for a primary cell, which is the FDD and for secondary cells c and c1, which is the TDD, $k_{PHICH}$ is 4. In FDD-TDD carrier aggregation, for the serving cell c, which is the TDD, $k_{PHICH}$ is given by Table 1. In FDD-TDD carrier aggregation, for a serving cell c, which is the FDD and a serving cell c1, which is the TDD, $k_{PHICH}$ is 6.

In a subframe bundling operation, a PHICH resource is related to a final subframe of the bundling.

Hereinafter, a method of determining a PHICH resource in a subframe $n+k_{PHICH}$ will be described in detail. As described above, the PHICH is a control channel in which the base station transmits ACK/NACK for uplink data transmission of the UE. A plurality of PHICHs may be mapped to the same resource element set forming a PHICH group. PHICHs within the same PHICH group are divided by other orthogonal sequences. A resource transmitted by a PHICH is referred to as a PHICH resource, and the PHICH resource may be distinguished by an index pair such as $(n^{group}_{PHICH}, n^{seq}_{PHICH})$. $n^{group}_{PHICH}$ represents a PHICH group number, and $n^{seq}_{PHICH}$ is an index of an orthogonal sequence within the PHICH group.

Equation 1 represents an index pair representing a PHICH resource.

$$n^{group}_{PHICH} = (I_{PRB\_RA} + n_{DMRS}) \bmod N^{group}_{PHICH} + I_{PHICH} N^{group}_{PHICH}$$

$$n^{seq}_{PHICH} = (\lfloor I_{PRB\_RA} / N^{group}_{PHICH} \rfloor + n_{DMRS}) \bmod 2N_{SF}^{PHICH}$$

[Equation 1]

In Equation 1, $n_{DMRS}$ may be a value representing cyclic shift of a demodulation reference signal (DMRS) in corresponding PUSCH transmission. $n_{DMRS}$ is mapped from cyclic shift for a DMRS field in a most recent PDCCH having an uplink DCI format of a transmission block related to corresponding PUSCH transmission. That is, $n_{DMRS}$ may be instructed by a DMRA field in UL grant (uplink DCI format) that schedules a transmission block related to corresponding PUSCH transmission. When a PDCCH including an uplink DCI format of the transmission block does not exist, $n_{DMRS}$ may be set to 0.

$n_{DMRS}$ and cyclic shift for a DMRS field may be mapped as in Table 2.

TABLE 2

| Cyclic Shift for DMRS Field in PDCCH with uplink DCI format | $n_{DMRS}$ |
|---|---|
| 000 | 0 |
| 001 | 1 |
| 010 | 2 |
| 011 | 3 |
| 100 | 4 |
| 101 | 5 |
| 110 | 6 |
| 111 | 7 |

$N^{PHICH}_{SF}$ is a size of a spreading factor used for PHICH modulation.

$N^{group}_{PHICH}$ represents the number of PHICH groups set by a superordinate layer.

$I_{PHICH}$ is a value having 1 or 0, and PUSCH transmission is performed in a subframe n=4 or 9 (n is any one of 0 to 9 and such n is 4 or 9) and when time division duplex (TDD) uplink-downlink configuration (UL-DL configuration) is 0, $I_{PHICH}$ 1, and in other cases, $I_{PHICH}$ is 0.

$I_{PRB\_RA}$ may be given by Equation 2.

$$I_{PRB\_RA} = \begin{cases} I^{lowest\_index}_{PRB\_RA} & \text{for the first TB of a PUSCH with associated PDCCH or for the case of no associated PDCCH when the number of negatively acknowledged TBs is not equal to the number of TBs indicated in the most recent PDCCH associated with the corresponding PUSCH} \\ I^{lowest\_index}_{PRB\_RA} + 1 & \text{for a second TB of a PUSCH with associated PDCCH} \end{cases}$$ [Equation 2]

That is, in a first transmission block of a PUSCH having a related PDCCH or in a case in which a related PDCCH does not exist, when the number of transmission blocks received NACK is different from the number of transmission blocks instructed in a most recent PDCCH related to a corresponding PUSCH, $I_{PRB\_RA}$ is given to $I^{lowest\_index}_{PRB\_RA}$. '$I^{lowest\_index}_{PRB\_RA}+1$' is given to a second transmission block of a PUSCH having a related PDCCH. Here, $I^{lowest\_index}_{PRB\_RA}$ is a lowest physical resource block (PRB) index at a first slot of corresponding PUSCH transmission.

In frequency division duplex (FDD), the number $N^{group}_{PHICH}$ of a PHICH group is constant in an entire subframe and is given as follows.

$$N^{group}_{PHICH} = \begin{cases} \lceil N_g(N^{DL}_{RB}/8) \rceil & \text{for normal cyclic prefix} \\ 2 \cdot \lceil N_g(N^{DL}_{RB}/8) \rceil & \text{for extended cyclic prefix} \end{cases}$$ [Equation 3]

Here, $N_g \in \{1/6, 1/2, 1, 2\}$ and is given through a superordinate layer signal. $n^{group}_{PHICH}$ has a range from 0 to $N^{group}_{PHICH}-1$.

In time division duplex (TDD), the number of PHICH groups may be variously changed between subframes. The number of PHICH groups may be given to $m_i N^{group}_{PHICH}$, and $m_i$ may be given as in Table 3. $N^{group}_{PHICH}$ is given by Equation 3, and for a downlink subframe having a PHICH resource, an index $n^{group}_{PHICH}$ has a range from 0 to $m_i N^{group}_{PHICH}-1$.

TABLE 3

| Uplink-downlink configuration | Subframe number i | | | | | | | | | |
|---|---|---|---|---|---|---|---|---|---|---|
| | 0 | 1 | 2 | 3 | 4 | 5 | 6 | 7 | 8 | 9 |
| 0 | 2 | 1 | 0 | 0 | 0 | 2 | 1 | 0 | 0 | 0 |
| 1 | 0 | 1 | 0 | 0 | 1 | 0 | 1 | 0 | 0 | 1 |
| 2 | 0 | 0 | 0 | 1 | 0 | 0 | 0 | 0 | 1 | 0 |
| 3 | 1 | 0 | 0 | 0 | 0 | 0 | 0 | 0 | 1 | 1 |
| 4 | 0 | 0 | 0 | 0 | 0 | 0 | 0 | 0 | 1 | 1 |
| 5 | 0 | 0 | 0 | 0 | 0 | 0 | 0 | 0 | 1 | 0 |
| 6 | 1 | 1 | 0 | 0 | 0 | 1 | 1 | 0 | 0 | 1 |

In the PHICH, as a modulation method, binary phase shift keying (BPSK) is used. Bit blocks $b(0), \ldots, b(M_{bit}-1)$ transmitted through one PHICH becomes modulation symbols having complex values $z(0), \ldots, z(M_s-1)$ through modulation. Here, $M_s = M_{bit}$.

A symbol-wise orthogonal sequence is multiplied to the modulation symbols $z(0), z(M_s-1)$, and the modulation symbols $z(0), \ldots, z(M_s-1)$ are scrambled and thus modulation symbols $d(0), \ldots, d(M_{symb}-1)$ are generated by Equation 4.

$$d(i) = w(i \bmod N^{PHICH}_{SF}) \cdot (1 - 2c(i)) \cdot z(\lfloor i/N^{PHICH}_{SF} \rfloor)$$ [Equation 4]

$i = 0, \ldots, M_{symb} - 1$ $M_{symb} = N^{PHICH}_{SF} \cdot M_s$ $$N^{PHICH}_{SF} = \begin{cases} 4 & \text{normal cyclic prefix} \\ 2 & \text{extended cyclic prefix} \end{cases}$$

In Equation 4, $c(i)$ is a cell-specific scrambling sequence. An initial value $c_{init}$ of $c(i)$ may be given by Equation 5 for each subframe.

$$c_{init} = (\lfloor n_s/2 \rfloor + 1) \cdot (2N^{cell}_{ID} + 1) \cdot 2^9 + N^{cell}_{ID}$$ [Equation 5]

In Equation 5, $N^{cell}_{ID}$ means physical layer cell ID, and $n_s$ is a slot number within a radio frame.

An orthogonal sequence [w(0) ... w($N^{PHICH}_{SF}-1$)] used for spreading of a PHICH is given in Table 4. In this case, $n^{seq}_{PHICH}$ corresponds to a PHICH number within a PHICH group.

TABLE 4

| Sequence index $n^{seq}_{PHICH}$ | Orthogonal sequence | |
|---|---|---|
| | Normal cyclic prefix $N^{PHICH}_{SF} = 4$ | Extended cyclic prefix $N^{PHICH}_{SF} = 2$ |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

In BPSK modulation, one bit b(i) is mapped to a modulation symbol x=I+jQ having a complex value, and in this case, a value of I and Q may be given in Table 5.

TABLE 5

| b(i) | I | Q |
|---|---|---|
| 0 | $1/\sqrt{2}$ | $1/\sqrt{2}$ |
| 1 | $-1/\sqrt{2}$ | $-1/\sqrt{2}$ |

Figure 9:
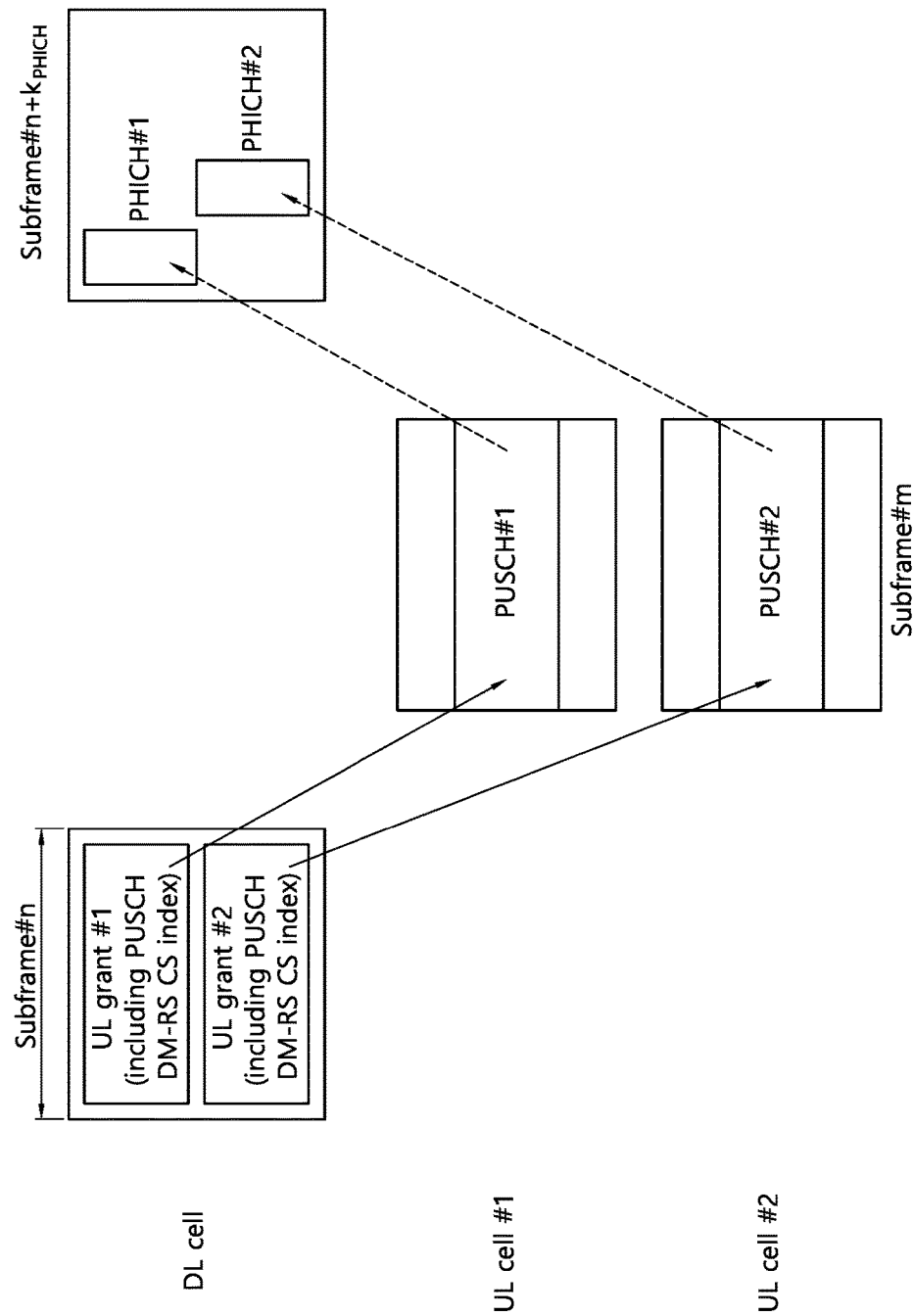
FIG. 9 illustrates a conventional method of receiving a PHICH.

FIG. 9 illustrates a conventional method of receiving a PHICH.

Referring to FIG. 9, the UE receives UL grant #1 and #2 in a downlink cell. UL grant may be referred to as an uplink DCI format. In each UL grant, a field notifying resource allocation information that schedules PUSCH transmission and a PUSCH DM-RS cyclic shift index may be included.

For example, it is assumed that UL grant #1 schedules transmission of a PUSCH #1 of an uplink cell #1 and that UL grant #2 schedules transmission of a PUSCH #2 of an uplink cell #2.

ACK/NACK of the PUSCH #1 is transmitted by the base station through a PHICH #1 of a downlink cell (i.e., the UE receives ACK/NACK in the PHICH #1), and ACK/NACK of the PUSCH #2 is transmitted by the base station through the PHICH #2 of a downlink cell (i.e., the UE receives ACK/NACK in the PHICH #2).

When a lowest PRB index at a first slot of the PUSCH #1 transmitted from the uplink cell #1 is the same as a lowest PRB index at a first slot of the PUSCH #2 transmitted from the uplink cell #2 and when values of a PUSCH DM-RS cyclic shift index included in each of the UL grant #1 and #2 are the same, the PHICH #1 and the PHICH #2 may be transmitted from the same PHICH resource.

According to the foregoing conventional method, when a cell set to the UE or the number of carriers increases, as in massive CA, it is difficult to prevent a PHICH resource from colliding. The following methods suggesting in the present invention can efficiently solve a PHICH resource collision problem. Further, even if the number of cells set to the UE is 5 or less, the present invention may be applied to prevent a PHICH resource from colliding. A rule may be defined such that such suggested methods are limitedly applied to solve only a PHICH resource collision problem of the foregoing CASE#A and CASE#B. Further, a rule may be defined such that the following suggested methods are limitedly applied only when a massive CA mode is set, when an uplink cell (or uplink LCELL, uplink UCELL, or uplink LCELL(S)/UCELL(S)) is set to the previously defined or signaled number or more or when a preset uplink cell (or preset uplink LCELL, preset uplink UCELL, or preset uplink LCELL(S)/UCELL(S)) is set to the previously defined or signaled number or more, when an activated uplink cell (or activated uplink LCELL(S), activated uplink UCELL, or activated uplink LCELL(S)/UCELL(S)) is set to the previously defined or signaled number or more, when a (PUCCH) cell group (CG) is set to the previously defined or signaled number or more, when PUCCH transmission is set on a previously defined or signaled secondary cell, when an uplink cell cross-carrier scheduled (CCS) (set or activated) from one preset or activated downlink cell is the previously defined or signaled number (e.g., 6) or more, and/or when uplink cross-carrier scheduling technique is set.

[Suggested Method #1] When there are PUSCH transmissions on a plurality of uplink cells cross-carrier scheduled from one downlink cell, for each PUSCH transmission, a "lowest PRB index at a first slot" and a "PUSCH DM-RS cyclic shift index" may be determined. In this case, when at least one of a "lowest PRB index at a first slot" determined on each PUSCH transmission basis and "PUSCH DM-RS cyclic shift index" is different on each PUSCH transmission basis, an existing PHICH resource index determination method may be applied.

When "a lowest PRB index at a first slot" related to PUSCH transmissions on a plurality of uplink cells cross-carrier scheduled from one downlink cell and a "PUSCH DM-RS cyclic shift index" are the same between PUSCH transmissions, a (lowest) CCE index or an ECCE index, or offset on a previously defined or signaled UE basis or on a cell/cell group basis related to corresponding UL grant may be set to use as a PHICH resource index offset according to a previously defined or signaled rule.

In another example, when a "PUSCH DM-RS cyclic shift index" and "a lowest PRB index at a first slot" related to PUSCH transmissions (or scheduling) on a plurality of uplink cells cross-carrier scheduled from one downlink cell are the same between PUSCH transmissions, it may be set to use a CIF value (and/or a cell index of a cross-carrier scheduled uplink cell) on corresponding UL grant as offset of a PHICH resource index according to a previously defined or signaled rule. Particularly, although timing of UL grant is different, when PHICH timing is the same, a PHICH resource collision problem may be efficiently mitigated. That is, although UL grants are received in different subframe, when PHICHs of PUSCHs scheduled by each of the UL grants are received in the same subframe, a PHICH resource collision problem may be efficiently mitigated.

For example, a lowest CCE or ECCE index (and/or a CIF value on UL grant and/or a cell index of a CCS uplink cell and/or offset on a previously defined or signaled UE basis or on a cell/cell group basis, hereinafter, the same) of UL grant used as offset of a PHICH resource index in the suggested method #1 may be inserted into Equation 6 and/or Equation 7. In this case, an index of the CCE/ECCE may be set to insert into a previously defined or signaled specific (portion) position(s). In Equations 6 and 7, positions that may insert an index of CCE/ECCE may be represented with (A)-(L).

$$n^{group}_{PHICH} = ((I_{PRB\_RA} + n_{DMRS} + (A)) \cdot (B)) \mod (N^{group}_{PHICH} + (C)) + I_{PHICH} \cdot N^{group}_{PHICH} + (D) \quad \text{[Equation 6]}$$

$$n^{seq}_{PHICH} = (\lfloor (I_{PRB\_RA} \cdot (E) + (F))/(N^{group}_{PHICH} + (G)) \rfloor \cdot (H) + n_{DMRS} \cdot (I) + (J)) \mod (2 \cdot N^{PHICH}_{SF} + (K)) + (L) \quad \text{[Equation 7]}$$

An lowest CCE/ECCE index (and/or a CIF value on UL grant, cell index of an CCS uplink cell, and/or offset on a previously defined or signaled UE basis or a cell/cell group basis) of corresponding UL grant may be limited to use for offset use of $n^{seq}_{PHICH}$, which is an orthogonal sequence index and/or offset use of $n^{group}_{PHICH}$, which is a PHICH group number.

[Suggested Method #2] (1) A rule may be defined such that the foregoing suggested method #1 is applied to determine a final PHICH resource index related to PUSCH transmissions on entire or specific portion uplink cell CCS from one downlink cell. Alternatively, (2) a rule may be defined such that parameters related to PUSCH transmission, i.e., "a lowest PRB index at a first slot" and a "PUSCH DM-RS cyclic shift index" are applied to determine a PUSCH transmission related final PHICH resource index on the same entire or specific portion uplink cell.

The specific portion uplink cell may be set to the remaining uplink cells, except for the previously defined (or signaled) number of uplink cells having relatively low (or high) cell index or a previously defined or signaled specific (one) uplink cell.

Figure 10:
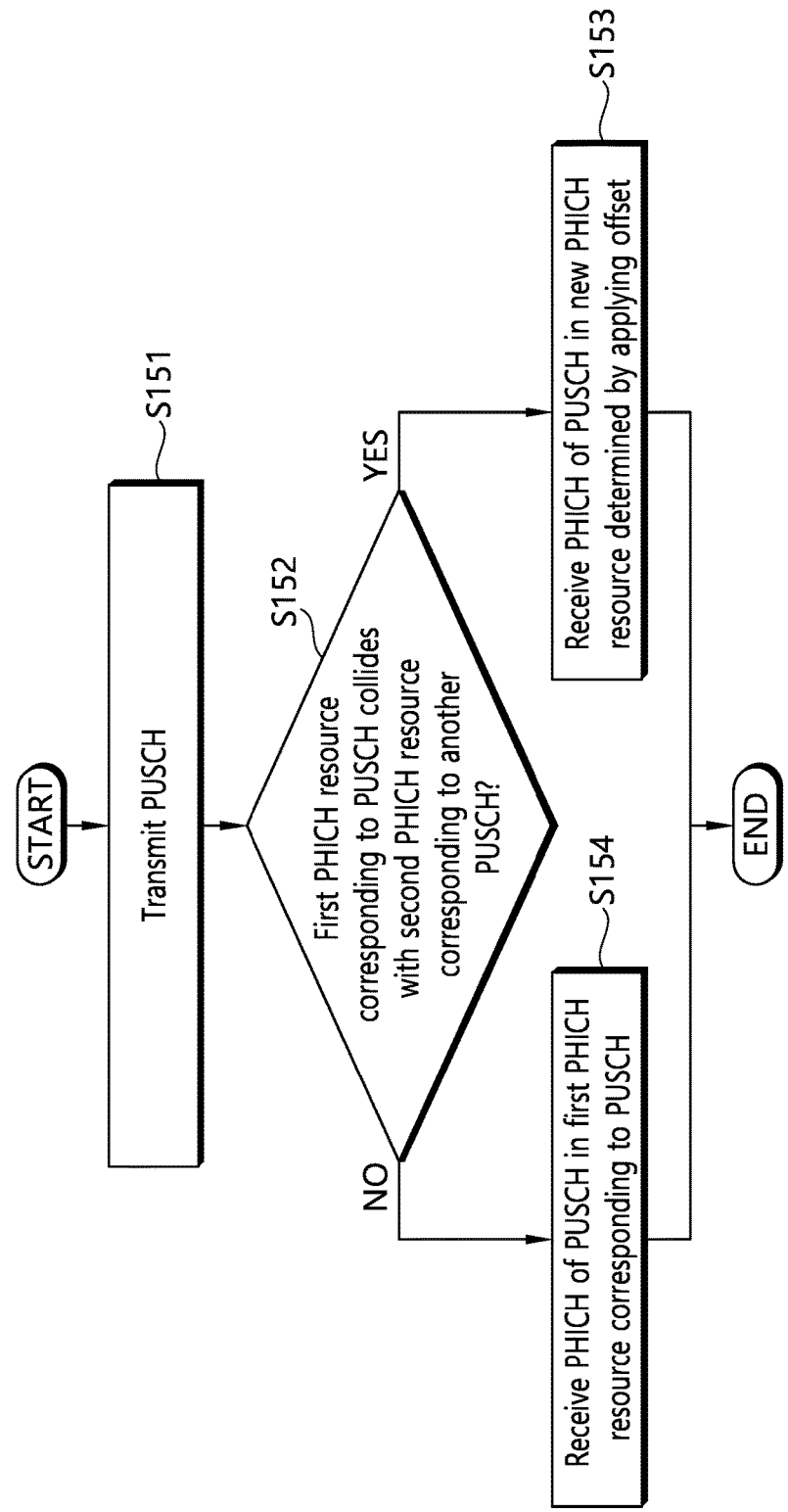
FIG. 10 illustrates an example of applying the suggested method #1 or #2.

FIG. 10 illustrates an example of applying the suggested method #1 or #2.

Referring to FIG. 10, the UE transmits a PUSCH (S151).

The UE determines whether a first PHICH resource corresponding to the PUSCH collides with a second PHICH resource corresponding to another PUSCH (S152). The UE simultaneously transmits the PUSCH and the another PUSCH, but the UE may transmit the PUSCH through a first cell and transmit the another PUSCH through a second cell. The first cell and the second cell may be cells having different frequencies. The PUSCH and the another PUSCH may be scheduled by DCIs received in one downlink cell. A determining method of a PHICH resource corresponding to the PUSCH has been described with reference to Equations 1 to 3.

When the first PHICH resource collides with the second PHICH resource, the UE receives a PHICH of the PUSCH in a new PHICH resource determined by applying an offset value (S153). As described in Equation 1 to 3, according to a conventional method, a PHICH resource is determined based on a lowest physical resource block (PRB) index transmitted by a PUSCH (at a first slot) and a cyclic shift index of a reference signal (more specifically, demodulation reference signal: DM-RS) transmitted in the PUSCH.

When a lowest PRB index that determines a first PHICH resource and a cyclic shift index of a reference signal are the same as a lowest PRB index that determines the second PHICH resource and a cyclic shift index of a reference signal, the UE may determine that the first PHICH resource collides with the second PHICH resource.

An offset value used for preventing the first PHICH resource and the second PHICH resource from colliding may be a lowest CCE/ECCE index value among CCE/ECCE index values of resources that receive downlink control information (DCI and may be referred to as UL grant) that schedules the PUSCH. Because DCI that schedules another PUSCH is received in a resource area configured with different CCE/ECCEs, lowest CCE/ECCE index values of the DCI are not overlapped. Therefore, when the lowest CCE/ECCE index value is used as an offset value, PHICH resources can be prevented from colliding.

An offset value used for preventing the first PHICH resource and the second PHICH resource from colliding may be a carrier indicator field (CIF) value included in downlink control information (DCI) that schedules the PUSCH. When the PUSCH and the another PUSCH are transmitted in different uplink cells, CIF values are different. Therefore, when the CIF value is used as an offset value, PHICH resources may be prevented from colliding.

Alternatively, the offset value may be preset to the UE. Further, the offset value may be a value added to a cyclic shift index of a reference signal transmitted from the PUSCH.

However, when the first PHICH resource does not collide with the second PHICH resource, the UE receives a PHICH of the PUSCH in the first PHICH resource corresponding to the PUSCH (S154). That is, when the first PHICH resource does not collide with the second PHICH resource, the UE receives a PHICH in a PHICH resource determined by an existing method.

[Suggested Method #3]

Figure 11:
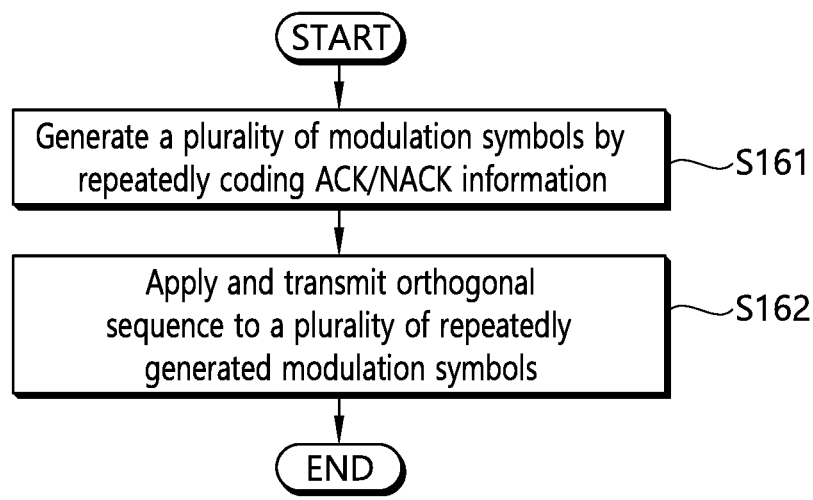
FIG. 11 illustrates an ACK/NACK transmitting method through a PHICH.

FIG. 11 illustrates an ACK/NACK transmitting method through a PHICH.

Referring to FIG. 11, by repeatedly coding ACK/NACK information, a plurality of modulation symbols are generated (S161). That is, 1 bit of HARQ-ACK information (i.e., NACK is 1, ACK is 0, and vice versa) transferred through a PHICH, may be repeated in three complex-valued modulation BPSK symbol formats according to previously defined repetition coding. For example, NACK and ACK may be repeated as in Equation 8.

$$NACK \to \left(\frac{-1}{\sqrt{2}} - j\frac{1}{\sqrt{2}}\right), \left(\frac{-1}{\sqrt{2}} - j\frac{1}{\sqrt{2}}\right), \left(\frac{-1}{\sqrt{2}} - j\frac{1}{\sqrt{2}}\right) \quad \text{[Equation 8]}$$

$$ACK \to \left(\frac{1}{\sqrt{2}} + j\frac{1}{\sqrt{2}}\right), \left(\frac{1}{\sqrt{2}} + j\frac{1}{\sqrt{2}}\right), \left(\frac{1}{\sqrt{2}} + j\frac{1}{\sqrt{2}}\right)$$

An orthogonal sequence is applied and transmitted to each complex-valued modulation symbol (S162). For example, each orthogonal sequence of a previously defined length (e.g., in a normal CP, $N^{PHICH}_{SF}=4$, and in an extension CP, $N^{PHICH}_{SF}=2$) may be multiplied and transmitted on a complex-valued modulation BPSK symbol basis. The orthogonal sequence may be represented with [w(0) . . . w($N^{PHICH}_{SF}-1$)]. In this case, a result that multiplies an orthogonal sequence to a complex-valued modulation BPSK symbol may be represented with Equation 9.

$$d(i) = w(i \bmod N^{PHICH}_{SF}) \cdot (1-2c(i)) \cdot z(\lfloor i/N^{PHICH}_{SF} \rfloor) \quad \text{[Equation 9]}$$

In order to mitigate a PHICH resource collision problem between different UEs, a rule may be defined to additionally multiply an orthogonal sequence of a previously defined length (e.g., $L^{PHICH}_{SF}=3$) (before step S162) to three complex-valued modulation BPSK symbols derived through the foregoing step S161. The orthogonal sequence may be, for example, [e(0) . . . e($L^{PHICH}_{SF}-1$)]. Thereby, even if a PHICH resource collision occurs, an error may be removed one more time using coding using an orthogonal sequence. After such a process, ACK and NACK may be represented with Equation 10.

$$NACK \to \left(\frac{-1}{\sqrt{2}} - j\frac{1}{\sqrt{2}}\right) \cdot e(0), \quad \text{[Equation 10]}$$

$$\left(\frac{-1}{\sqrt{2}} - j\frac{1}{\sqrt{2}}\right) \cdot e(1), \left(\frac{-1}{\sqrt{2}} - j\frac{1}{\sqrt{2}}\right) \cdot e(2),$$

$$ACK \to \left(\frac{1}{\sqrt{2}} + j\frac{1}{\sqrt{2}}\right) \cdot e(0),$$

$$\left(\frac{1}{\sqrt{2}} + j\frac{1}{\sqrt{2}}\right) \cdot e(1), \left(\frac{1}{\sqrt{2}} + j\frac{1}{\sqrt{2}}\right) \cdot e(2)$$

The foregoing step S162 may be applied to the NACK and ACK.

An orthogonal sequence in which $L^{PHICH}_{SF}=3$ may be defined to Table 6.

TABLE 6

| Sequence index | Orthogonal sequence $[e(0) \ldots e(L^{PHICH}_{SF} - 1)]$ |
| --- | --- |
| 0 | $[1\ 1\ 1]$ |
| 1 | $[1\ e^{j2\pi/3}\ e^{j4\pi/3}]$ |
| 2 | $[1\ e^{j4\pi/3}\ e^{j2\pi/3}]$ |

When the suggested method #3 is applied, by additionally multiplying orthogonal sequence $([e(0) \ldots e(L^{PHICH}_{SF}-1)])$ of a different index to a three complex-valued modulation BPSK symbol derived through step S161 to different UEs (i.e., it is assumed that downlink cells that receive PHICH timing and PHICH are the same) that perform PUSCH transmission based on the same "lowest PRB index at a first slot" and "PUSCH DM-RS cyclic shift index", efficient PHICH multiplexing may be supported.

Information related to an orthogonal sequence (i.e., $[e(0) \ldots e(L^{PHICH}_{SF}-1)]$) to which different UEs are used or applied may be set such that a base station notifies to an UE through previously defined (physical layer or superordinate layer) signaling.

Under an environment in which many number of cells are set with a carrier aggregation (CA) technique, in order to reduce an overhead and/or a (E)PDCCH false detection probability of corresponding cell related (downlink/uplink) scheduling information transmissions, it may be set such that (downlink/uplink) scheduling information related to a plurality of preset or signaled cells is transmitted through one DCI (or control channel). In this way, one DCI that schedules a plurality of cells may be, hereinafter, referred to as (DL/UL) "MUCC-DCI". Cells simultaneously scheduled through MUCC-DCI may be set or limited to cells of the same cell type, the same transmission mode (TM), the same system bandwidth, the same communication type, and/or the same cell group (CG).

A cell type means an UCELL and an LCELL, and a communication type means FDD and TDD. When PUSCH transmissions are scheduled on a plurality of uplink cells through one UL MUCC-DCI, the following suggested methods suggest an efficient PUSCH DM-RS CS and/or PHICH resource allocation method.

[Suggested Method #4]

(one or common) DM-RS CS value included in UL MUCC-DCI may be commonly equally applied to PUSCH transmissions on a plurality of simultaneously scheduled uplink cells. In this case, in order to mitigate a PHICH resource collision problem, at least one of a scheduled uplink cell related CIF value, scheduled uplink cell related cell index, and/or offset on a previously defined or signaled UE/cell/cell group basis may be used as offset of a PHICH resource index or may be set to use as offset of a PHICH resource index.

[Suggested Method #5]

It may be set to apply different DM-RS CS values to a plurality of uplink cells simultaneously scheduled based on (one) DM-RS CS value included in UL MUCC-DCI according to a previously defined rule.

For example, (one) DM-RS CS (index) value (hereinafter, "CS#X") on UL MUCC-DCI is applied only to PUSCH transmission on a (scheduled) uplink cell (i.e., uplink cell #0) having a relatively lowest (or small) CIF value (and/or cell index), and each offset value may be applied in an ascending order (or descending order) direction of a (uplink) cell index (and/or CIF value(s)) to PUSCH transmission(s) on the remaining (scheduled) uplink cells (i.e., uplink cell #1, uplink cell #2). For example, when a DM-RS CS value applied to an uplink cell #1 is CS#(X+CYC_OFFSET), a DM-RS CS value applied to an uplink cell #2 may be CS#(X+CYC_OFFSET*2).

That is, it may be interpreted that DM-RS CS (index) values applied to PUSCH transmissions on the uplink cell #1 and the uplink cell #2 (sequentially or cyclic shift) cumulatively apply previously defined or signaled offset (this is represented with "CYC_OFFSET") in ascending order (or descending order) direction of a (uplink) cell index (and/or CIF value) in CS#X applied to an uplink cell #0. The offset value may be a positive value (meaning increase) or a negative value (meaning reduction). According to such a method, because DM-RS CS values are different in each uplink cell, collision of a PHICH resource does not occur.

The UE may be set to transmit corresponding (downlink/uplink) MUCC-DCI through UE-SPECIFIC SEARCH SPACE (USS) and/or COMMON SEARCH SPACE (CSS) related to a specific portion or entire cells (i.e., use for scheduling a corresponding cell) within a previously defined or signaled cell group within a cell group (CG) to which multi-carrier scheduling is applied based on MUCC-DCI (hereinafter, may be simply referred to as MUCC-DCI) that schedules downlink or uplink. That is, the UE may be set to detect MUCC-DCI only through USS/CSS of a predetermined or preset specific cell within a cell group to which multi-carrier scheduling is applied.

For example, it is assumed that a cell #1, a cell #2, and a cell #3 are a cell group to which multi-carrier scheduling scheduled based on one MUCC-DCI is applied. In this case, in order to transmit MUCC-DCI, USS (and/or CSS) of the cell #1 and the cell #2 may be used. In this case, (1) only one cell of the cell #1 and the cell #2 may be set to a cell for transmitting MUCC-DCI and may be set to receive/detect MUCC-DCI through USS (and/or CSS) related to the cell #1 and the cell #2 in one cell or (2) both the cell #1 and the cell #2 may be set to a cell for transmitting MUCC-DCI and may be set to receive/detect MUCC-DCI through USS (and/or CSS) on corresponding each cell.

MUCC-DCI may include a field or an indicator notifying whether a specific cell is scheduled by the MUCC-DCI. The field or the indicator may be a bit map format. The field is referred to as an "ONFIELD". When the ONFIELD indicates that a deactivated cell is scheduled, the UE may assume (or regard) that an entire corresponding MUCC-DCI is ineffective.

Alternatively, when the ONFIELD indicates that a deactivated cell is scheduled, the UE may assume (or regard) that only scheduling information related to the deactivated cell is ineffective in corresponding MUCC-DCI. That is, in the MUCC-DCI, the UE may assume (or regard) that the remaining information, i.e., activated cell related scheduling information, except for corresponding deactivated cell related scheduling information is effective.

In another example, only when the entire cells set to a target of MUCC-DCI based multi-carrier scheduling are deactivated, an UE set to a MUCC-DCI based multi-carrier scheduling mode may be set not to monitor (or blind decode) corresponding MUCC-DCI (at an (E)PDCCH search space of a specific cell set to receive/detect the MUCC-DCI).

When such a rule is applied, if at least one of cells set to a target of MUCC-DCI based multi-carrier scheduling is activated, a corresponding UE set to the MUCC-DCI based multi-carrier scheduling mode monitors (or blind decodes)

the MUCC-DCI (at an (E)PDCCH search space of a specific cell set to receive/detect the MUCC-DCI).

Because examples of the described suggested method may be included as one of implementation methods of the present invention, the examples may be regarded as a kind of suggested method. Further, the described suggested methods may be independently implemented, but may be implemented into a combination (or combined) form of some suggested methods. Further, a rule may be defined such that the described suggested methods are limitedly applied to only a cell group configured with only a previously defined or signaled specific cell type (e.g., UCELL or LCELL) and/or a specific cell type (e.g., UCELL or LCELL). Further, a rule may be defined such that the described suggested methods are differently (or independently) applied on a cell type and/or cell group (and/or cell) basis.

Figure 12:
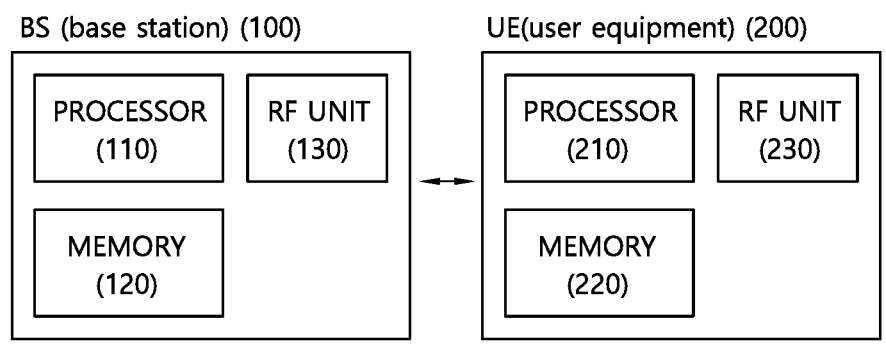
FIG. 12 is a block diagram illustrating a base station and an UE.

FIG. 12 is a block diagram illustrating a base station and an UE.

The BS 100 includes a processor 110, a memory 120, and a radio frequency unit (RF unit) 130. The processor 110 implements a suggested function, process, and/or method. The memory 120 is connected to the processor 110 to store various information for driving the processor 110. The RF unit 130 is connected to the processor 110 to transmit and/or receive a wireless signal. Methods of FIGS. 9 and 10 have been described as a method in which the UE receives a PHICH, but may be regarded as a method in which a base station transmits a PHICH. The processor 110 may be implemented with methods of FIGS. 9 to 11.

A UE 200 includes a processor 210, a memory 220, and an RF unit 230. The processor 210 implements a suggested function, process, and/or method. The memory 220 is connected to the processor 210 to store various information for driving the processor 210. The RF unit 230 is connected to the processor 210 to transmit and/or receive a wireless signal. A method of FIG. 11 has been described as a method in which a base station transmits ACK/NACK in a PHICH, but may be regarded as a method in which an UE receives ACK/NACK through a PHICH. The processor 210 may be implemented with methods of FIGS. 9 to 11.

The processors 110 and 210 includes may include an ASIC (Application-Specific Integrated Circuit), a chip set, a logical circuit, and/or a data processing device. The memories 120 and 220 may include a ROM (Read-Only Memory), a RAM (Random Access Memory), a flash memory, a memory card, a storage medium, and/or any other storage device. The RF units 130 and 230 may include a baseband circuit for processing a radio signal. When the embodiment is implemented by software, the foregoing techniques may be implemented as modules (processes, functions, and the like) performing the foregoing functions. The modules may be stored in the memories 120 and 220 and executed by the processors 110 and 210. The memories 120 and 220 may be provided within or outside the processors 110 and 120 and may be connected to the processors 110 and 210 through a well-known unit.

What is claimed is:

1. A method for receiving a physical hybrid-ARQ indicator channel (PHICH) of a User Equipment (UE) in a wireless communication system, the method comprising:
   transmitting a physical uplink shared channel (PUSCH);
   determining whether a first PHICH resource corresponding to the PUSCH collides with a second PHICH resource corresponding to another PUSCH; and
   receiving a PHICH of the PUSCH in a PHICH resource determined according to the determination result,
   wherein when the first PHICH resource collides with the second PHICH resource, a PHICH of the PUSCH is received in a new PHICH resource determined by applying an offset value,
   wherein the offset value is a lowest control channel element/enhanced control channel element (CCE/ECCE) index value among a plurality of CCE/ECCE index values of resources that receive downlink control information (DCI) that schedules the PUSCH, and
   wherein when applying the offset value by the UE, the lowest CCE/ECCE index value is added to at least one of (A) to (J) of equations 1 and 2 below:

$$n^{group}_{PHICH} = ((I_{PRB\_RA} + n_{DMRS}) \cdot (A)) \bmod (N^{group}_{PHICH} + (B)) + I_{PHICH} \cdot N^{group}_{PHICH} + (C), \text{ and} \quad \text{equation 1:}$$

$$n^{seq}_{PHICH} = (\lfloor (I_{PRB\_RA} \cdot (D))/(N^{group}_{PHICH} + (E)) \rfloor \cdot (F) + n_{DMRS} \cdot (G) + (H)) \bmod (2 \cdot N^{PHICH}_{SF} + (I)) + (J); \quad \text{equation 2:}$$

wherein:
   $n^{group}_{PHICH}$ is a PHICH group number,
   $n^{seq}_{PHICH}$ is an index of an orthogonal sequence within the PHICH group,
   $n_{DMRS}$ is a value representing cyclic shift of a demodulation reference signal (DMRS) in a corresponding PUSCH transmission,
   $N^{PHICH}_{SF}$ is a size of a spreading factor used for PHICH modulation,
   $N^{group}_{PHICH}$ is a number of PHICH groups set by a superordinate layer,
   $I_{PHICH}$ is a value having 1 if a PUSCH transmission is performed in a subframe n=4 or n=9 and if time division duplex (TDD) uplink-downlink configuration is 0, and else a value having 0, and
   $I_{PRB\_RA}$ is $I^{lowest\_index}_{PRB\_RA}$, when a number of transmission blocks received NACK (negative-acknowledgement) is different from a number of transmission blocks instructed in a most recent PDCCH related to a corresponding PUSCH in a first transmission block of a PUSCH having a related PDCCH or in a case in which a related PDCCH does not exist, or $I^{lowest\_index}_{PRB\_RA} + 1$ in a second transmission block of a PUSCH having a related PDCCH, where $I^{lowest\_index}_{PRB\_RA}$ is a lowest physical resource block (PRB) index at a first slot of corresponding PUSCH transmission.

2. The method of claim 1, wherein the first PHICH resource is determined based on a lowest physical resource block (PRB) index transmitted by the PUSCH and a cyclic shift index of a reference signal transmitted by the PUSCH.

3. The method of claim 2, wherein it is determined that the first PHICH resource collides with the second PHICH resource, when a lowest PRB index that determines the first PHICH resource and a cyclic shift index of a reference signal are the same as a lowest PRB index that determines the second PHICH resource and a cyclic shift index of a reference signal.

4. The method of claim 1, wherein the offset value is a carrier indicator field (CIF) value included in downlink control information (DCI) that schedules the PUSCH.

5. The method of claim 1, wherein the offset value is preset to the UE.

6. The method of claim 1, wherein the offset value is a value added to a cyclic shift index of a reference signal transmitted by the PUSCH.

7. The method of claim 1, wherein the PUSCH and the another PUSCH are simultaneously transmitted by the UE, but the PUSCH is transmitted by the UE through a first cell and the another PUSCH is transmitted by the UE through a second cell.

8. The method of claim 7, wherein the first cell and the second cell have different frequencies.

9. The method of claim 7, wherein the PUSCH and the another PUSCH are scheduled by DCI received in one downlink cell.

10. The method of claim 1, wherein the new PHICH resource is determined not to collide with the second PHICH resource by the offset value.

11. The method of claim 1, wherein a PHICH of the PUSCH is received through the first PHICH resource, when the first PHICH resource does not collide with the second PHICH resource.

12. The method of claim 1, wherein the UE supports aggregation of cells more than 5 cells.

13. A User Equipment (UE), comprising:
a radio frequency (RF) unit configured to transmit and receive a wireless signal; and
a processor operatively coupled to the RF unit,
wherein the processor is configured to:
transmit a physical uplink shared channel (PUSCH),
determine whether a first PHICH resource corresponding to the PUSCH collides with a second PHICH resource corresponding to another PUSCH,
receive a PHICH of the PUSCH in a PHICH resource determined according to the determination result, and
a PHICH of the PUSCH is received in a new PHICH resource determined by applying an offset value, when the first PHICH resource collides with the second PHICH resource,
wherein the offset value is a lowest control channel element/enhanced control channel element (CCE/ECCE) index value among a plurality of CCE/ECCE index values of resources that receive downlink control information (DCI) that schedules the PUSCH, and wherein when applying the offset value by the UE, the lowest CCE/ECCE index value is added to at least one of (A) to (J) of equations 1 or 2 below:

$$n^{group}_{PHICH} = ((I_{PRB\_RA} + n_{DMRS}) \cdot (A)) \bmod (N^{group}_{PHICH} + (B)) + I_{PHICH} \cdot N^{group}_{PHICH} + (C), \text{ and} \quad \text{equation 1:}$$

$$n^{seq}_{PHICH} = (\lfloor (I_{PRB\_RA} \cdot (D))/(N^{group}_{PHICH} + (E)) \rfloor \cdot (F) + n_{DMRS} \cdot (G) + (H)) \bmod (2 \cdot N^{PHICH}_{SF} + (I)) + (J); \quad \text{equation 2:}$$

wherein:
$n^{group}_{PHICH}$ is a PHICH group number,
$n^{seq}_{PHICH}$ is an index of an orthogonal sequence within the PHICH group,
$n_{DMRS}$ is a value representing cyclic shift of a demodulation reference signal (DMRS) in a corresponding PUSCH transmission,
$N^{PHICH}_{SF}$ is a size of a spreading factor used for PHICH modulation,
$N^{group}_{PHICH}$ is a number of PHICH groups set by a superordinate layer,
$I_{PHICH}$ is a value having 1 if a PUSCH transmission is performed in a subframe n=4 or n=9 and if time division duplex (TDD) uplink-downlink configuration is 0, and else a value having 0, and
$I_{PRB\_RA}$ is $I^{lowest\_index}_{PRB\_RA}$ when a number of transmission blocks received NACK (negative-acknowledgement) is different from a number of transmission blocks instructed in a most recent PDCCH related to a corresponding PUSCH in a first transmission block of a PUSCH having a related PDCCH or in a case in which a related PDCCH does not exist, or $I^{lowest\_index}_{PRB\_RA}+1$ in a second transmission block of a PUSCH having a related PDCCH, where $I^{lowest\_index}_{PRB\_RA}$ is a lowest physical resource block (PRB) index at a first slot of corresponding PUSCH transmission.

* * * * *